United States Patent
Kim et al.

(10) Patent No.: US 10,021,654 B2
(45) Date of Patent: Jul. 10, 2018

(54) METHOD FOR CONTROLLING POWER AND APPARATUS THEREFOR IN WIRELESS COMMUNICATION SYSTEM SUPPORTING DEVICE-TO-DEVICE COMMUNICATION

(71) Applicants: LG ELECTRONICS INC., Seoul (KR); SNU R&DB FOUNDATION, Seoul (KR)

(72) Inventors: Hakseong Kim, Seoul (KR); Jongwoo Hong, Seoul (KR); Sunghyun Choi, Seoul (KR); Hoyoung Yoon, Seoul (KR)

(73) Assignees: LG ELECTRONICS INC., Seoul (KR); SNU R&DB FOUNDATION, Seoul (KR)

( * ) Notice: Subject to any disclaimer, the term of this patent is extended or adjusted under 35 U.S.C. 154(b) by 0 days.

(21) Appl. No.: 15/327,960

(22) PCT Filed: Jul. 24, 2015

(86) PCT No.: PCT/KR2015/007716
§ 371 (c)(1),
(2) Date: Jan. 20, 2017

(87) PCT Pub. No.: WO2016/013901
PCT Pub. Date: Jan. 28, 2016

(65) Prior Publication Data
US 2017/0215154 A1 Jul. 27, 2017

Related U.S. Application Data

(60) Provisional application No. 62/028,784, filed on Jul. 24, 2014.

(51) Int. Cl.
*G08C 17/00* (2006.01)
*H04W 52/24* (2009.01)
(Continued)

(52) U.S. Cl.
CPC ........ *H04W 52/245* (2013.01); *H04B 17/318* (2015.01); *H04W 52/367* (2013.01);
(Continued)

(58) Field of Classification Search
CPC .. H04W 52/02; H04W 52/0203; H04W 84/12
See application file for complete search history.

(56) References Cited

U.S. PATENT DOCUMENTS

2013/0324182 A1* 12/2013 Deng ................. H04W 52/281
  455/522
2015/0334760 A1* 11/2015 Sartori ................. H04W 76/10
  370/329
(Continued)

FOREIGN PATENT DOCUMENTS

WO  2011121374  10/2011
WO  2014007581  1/2014

OTHER PUBLICATIONS

PCT International Application No. PCT/KR2015/007716, International Search Report dated Nov. 25, 2015, 2 pages.
(Continued)

*Primary Examiner* — Siren Wei
(74) *Attorney, Agent, or Firm* — Lee, Hong, Degerman, Kang & Waimey PC

(57) ABSTRACT

Disclosed are a method for controlling power and an apparatus therefor in a wireless communication system supporting device-to-device (D2D) communication. Specifically, a method for a terminal for controlling the transmission power of a physical sidelink discovery channel (PSDCH) in a wireless communication system supporting D2D communication comprises the steps of: calculating the sum of reception strengths of the total number of PSDCHs received from a set PSDCH reception period; and transmitting the PSDCH, wherein if the sum of reception strengths of the total number of PSDCHs is greater than a previously set threshold value,
(Continued)

then the PSDCH to be transmitted is transmitted under the transmission power controlled by the terminal, and if the sum of reception strengths of the total number of PSDCHs is less than a previously set threshold value, then the PSDCH to be transmitted can be transmitted under the maximum transmission power.

9 Claims, 17 Drawing Sheets

(51) Int. Cl.
  *H04W 76/02* (2009.01)
  *H04B 17/318* (2015.01)
  *H04W 52/36* (2009.01)
  *H04W 72/04* (2009.01)
  *H04W 52/38* (2009.01)
  *H04W 76/14* (2018.01)

(52) U.S. Cl.
  CPC ..... *H04W 52/383* (2013.01); *H04W 72/0446* (2013.01); *H04W 76/023* (2013.01); *H04W 76/14* (2018.02)

(56) References Cited

U.S. PATENT DOCUMENTS

2015/0365992 A1\* 12/2015 Lim ............... H04W 76/14
 370/329
2017/0150480 A1\* 5/2017 Kim ............... H04W 4/70

OTHER PUBLICATIONS

ETRI, "Resource allocation for D2D discovery", R1-134336, 3GPP TSG RAN WG1 Meeting #74bis, Oct. 2013, 4 pages.
Huawei et al., "Power control for D2D Signals", R1-141928, 3GPP TSG RAN WG1 Meeting #77, May 2014, 4 pages.

\* cited by examiner

[FIG. 1]
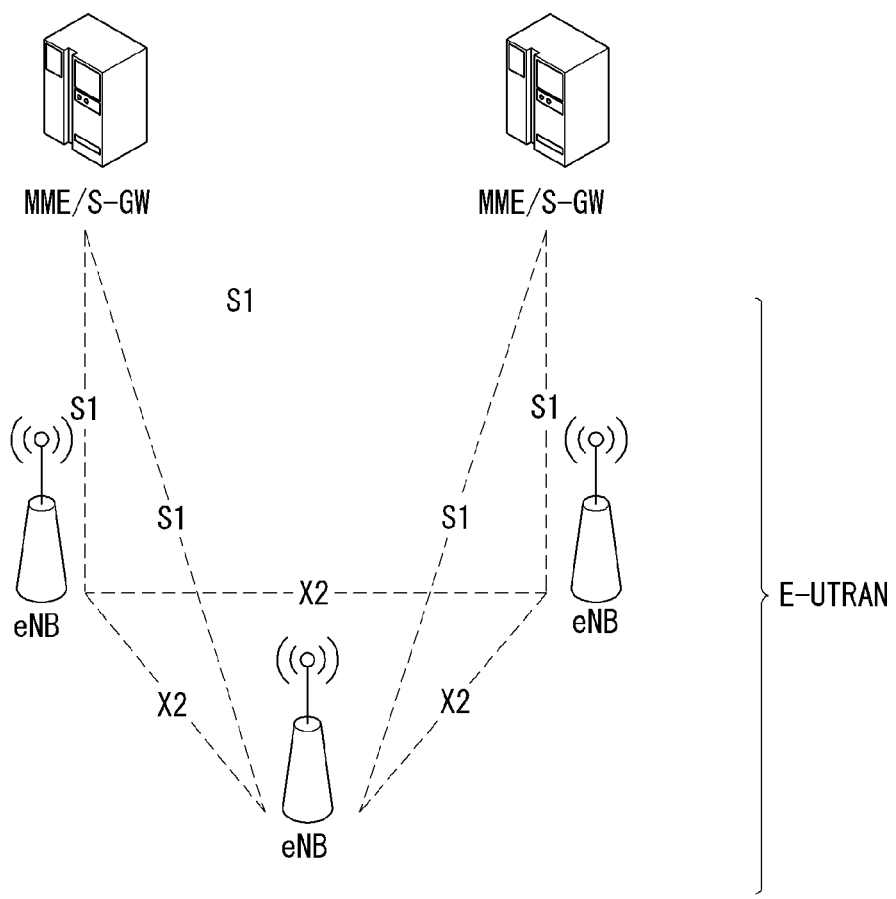

[FIG. 2]
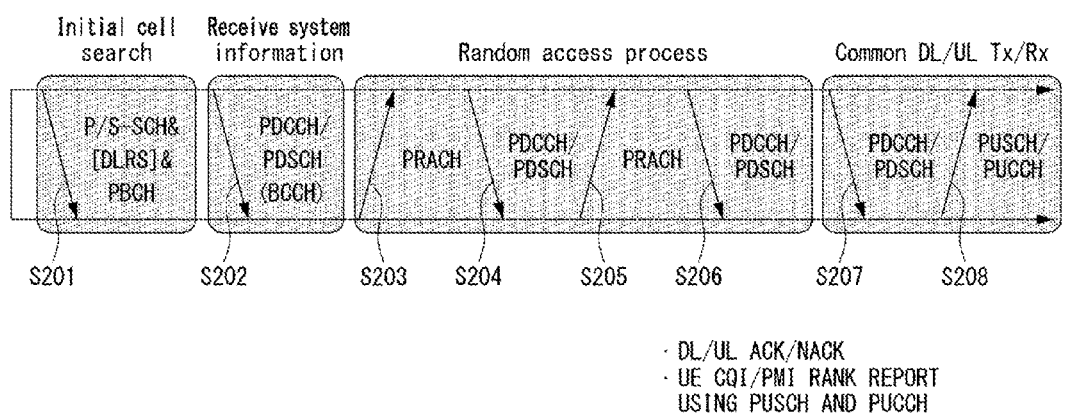

[FIG. 3]
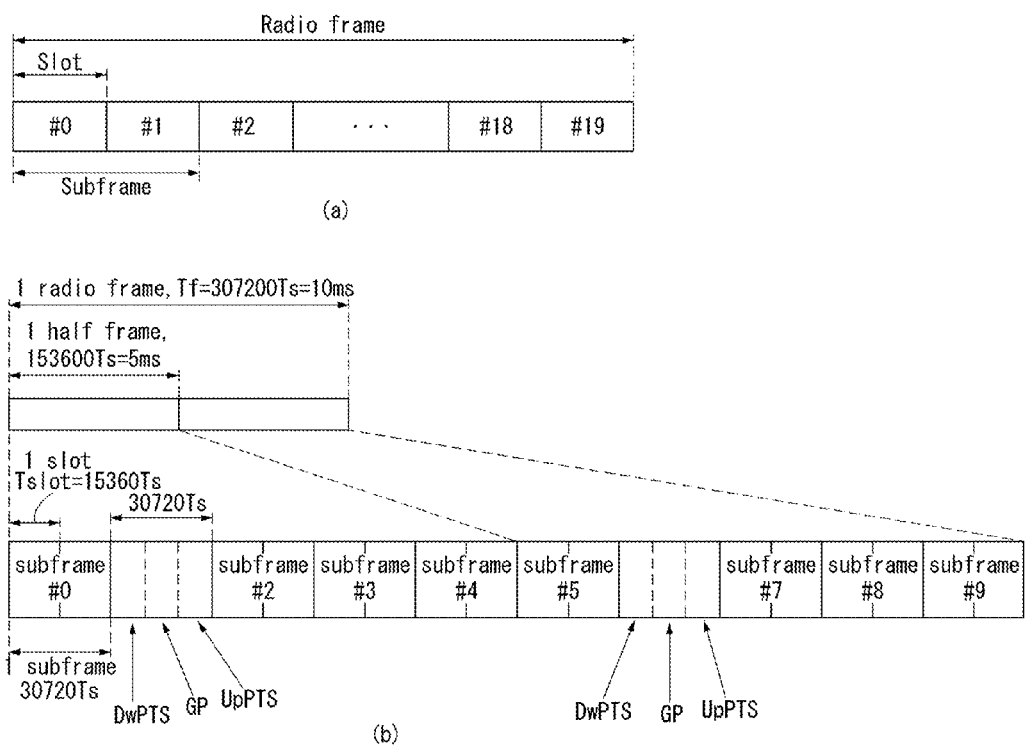

[FIG. 4]
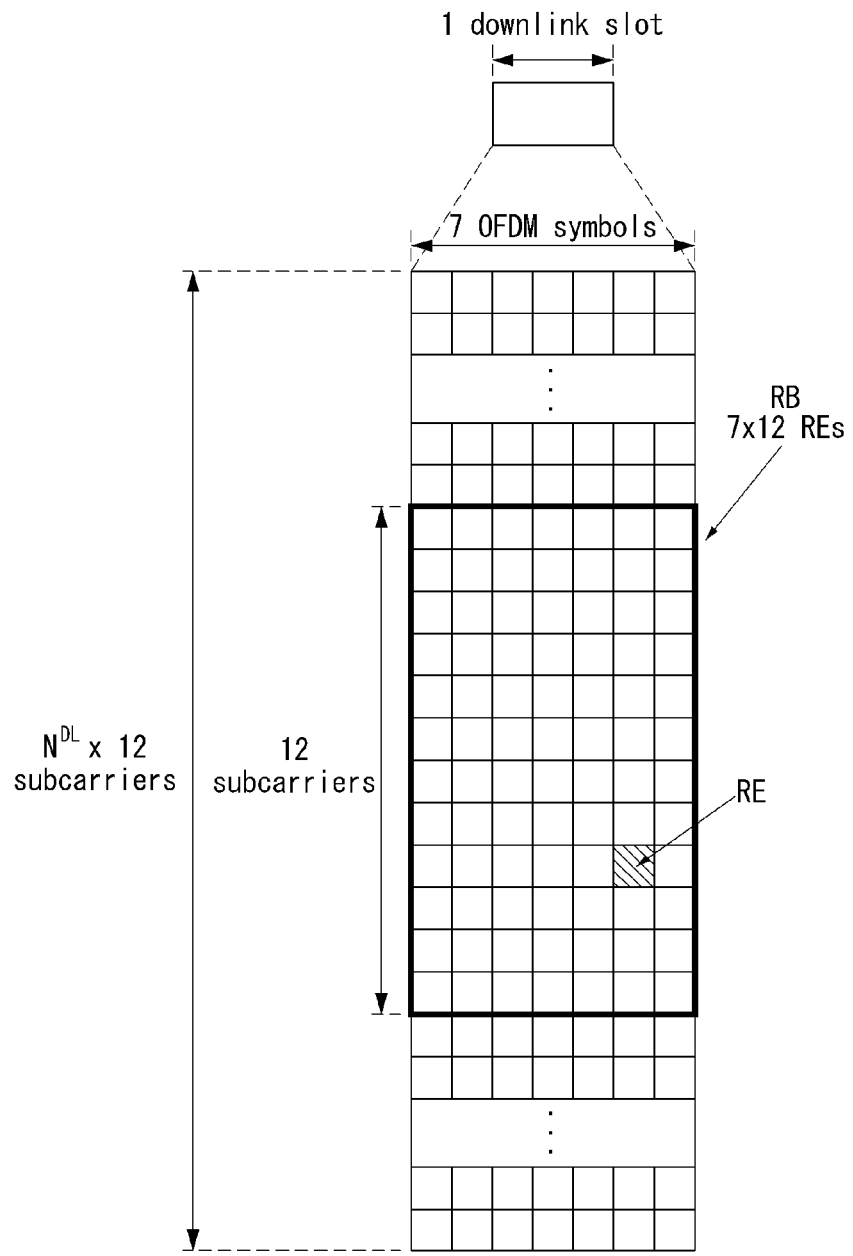

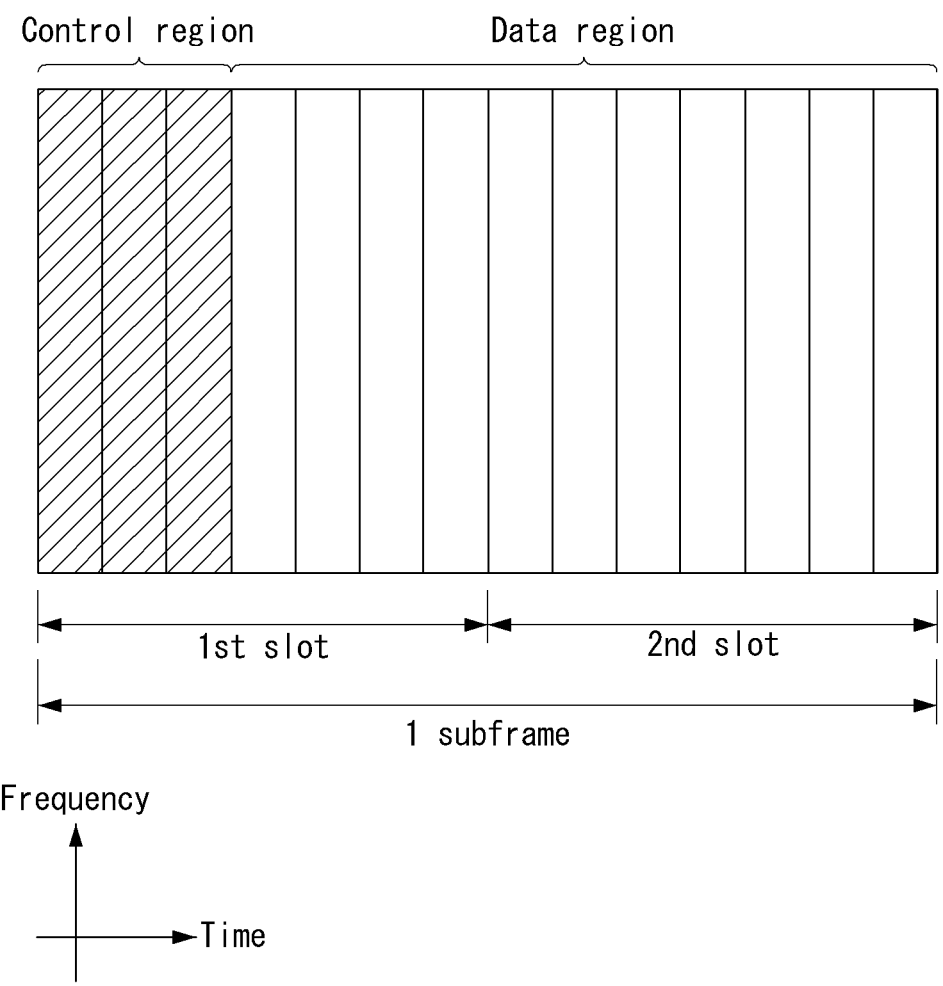

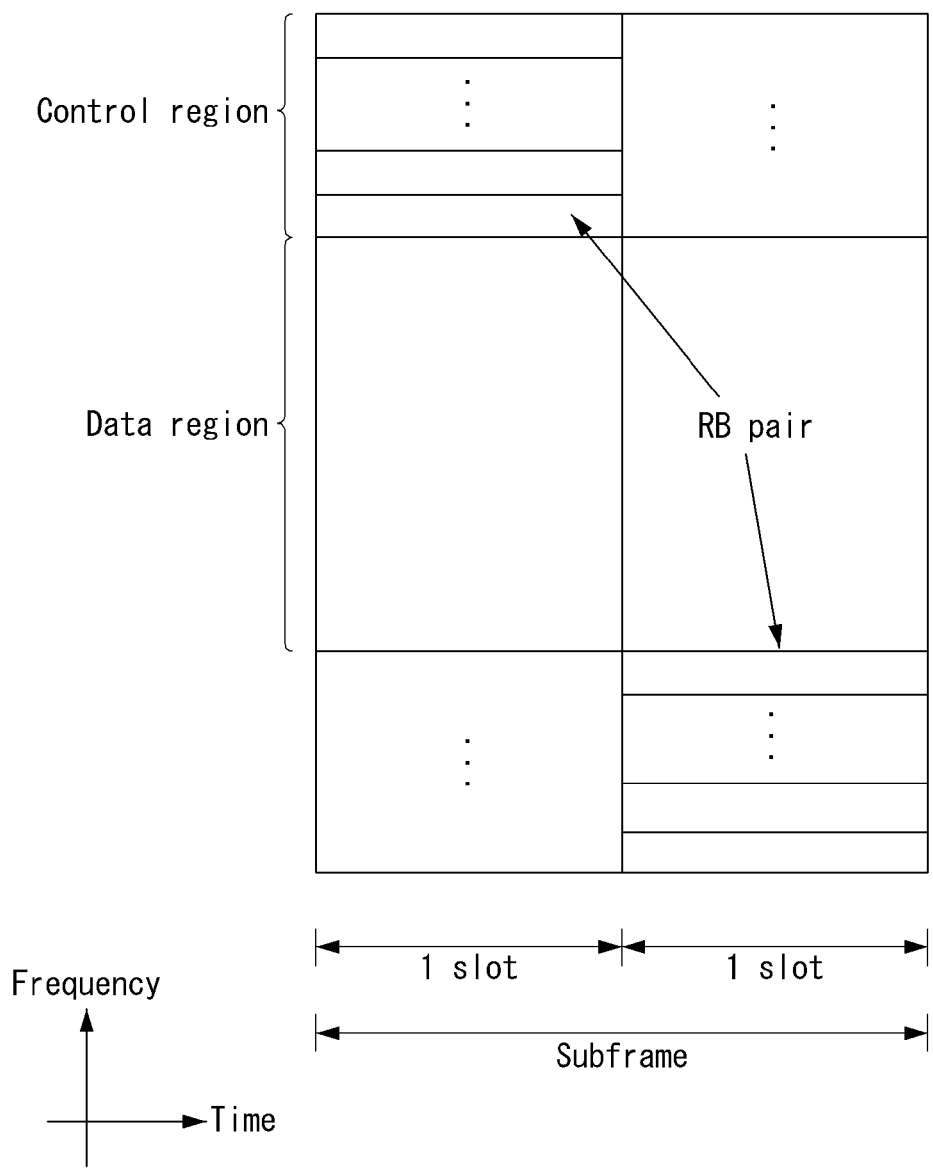

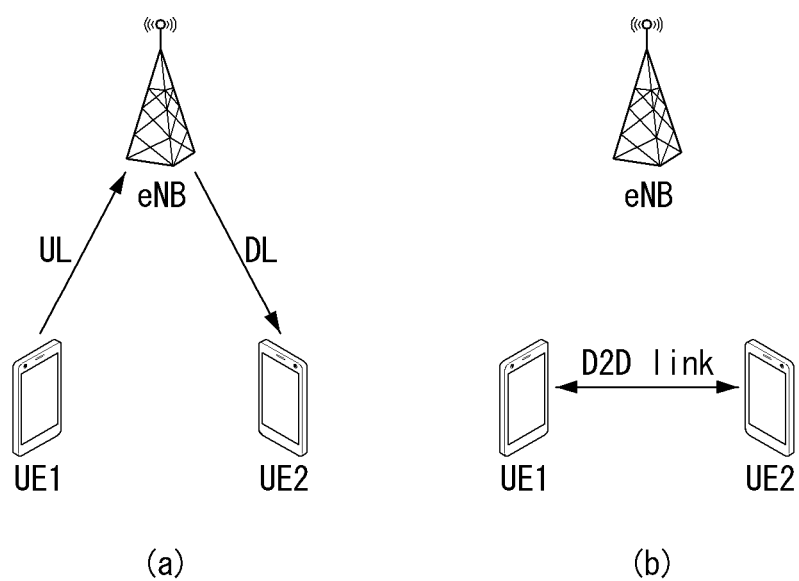
[FIG. 7]

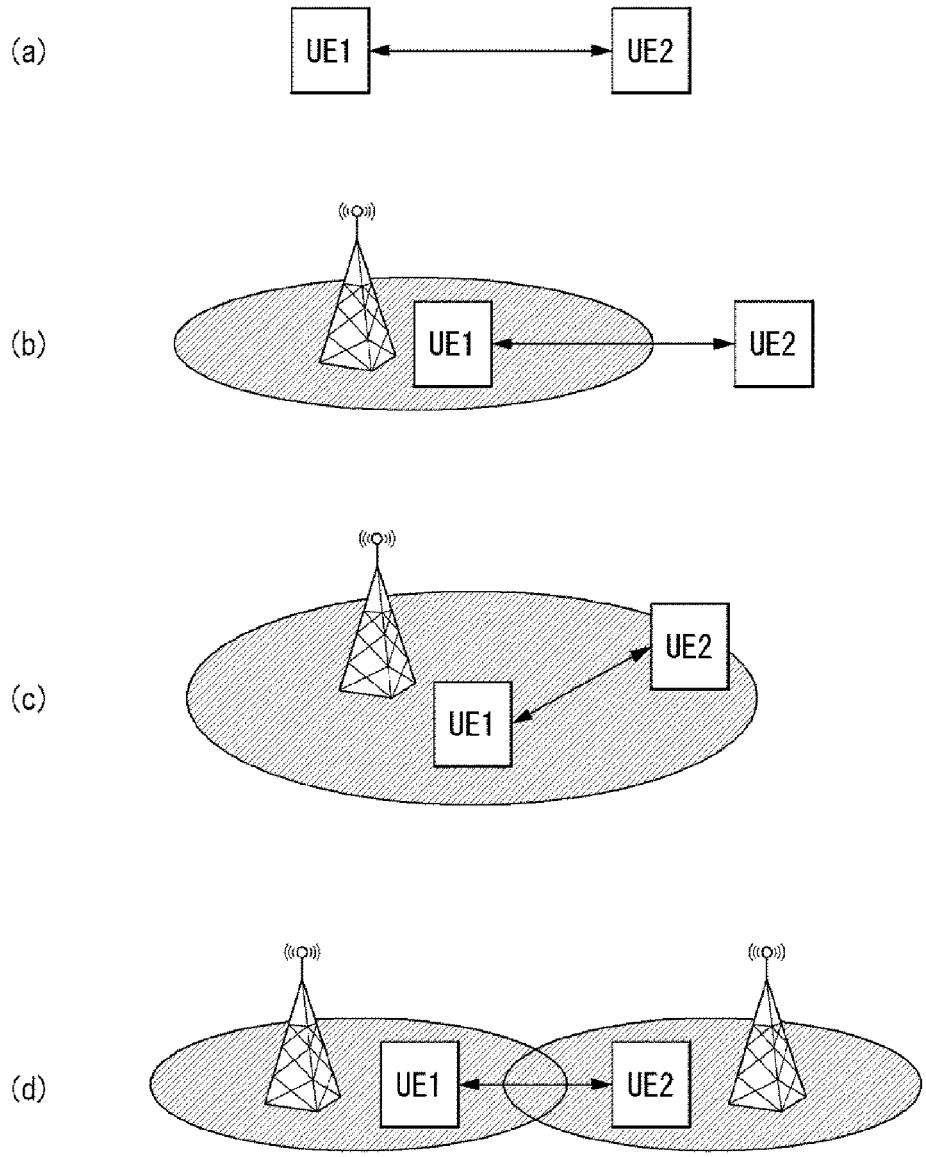
[FIG. 8]

[FIG. 9]
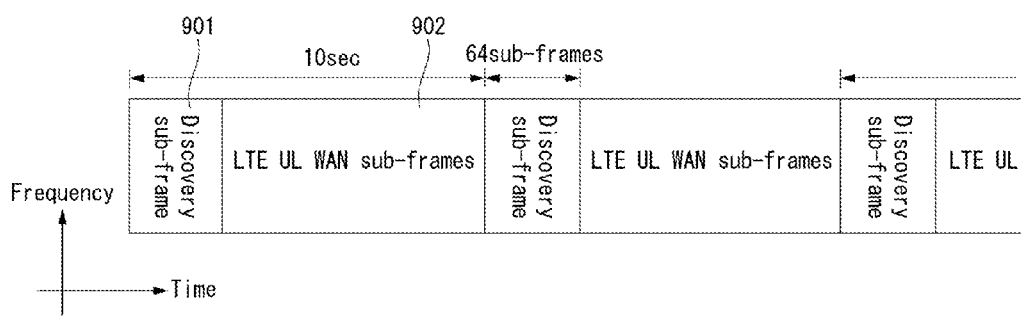

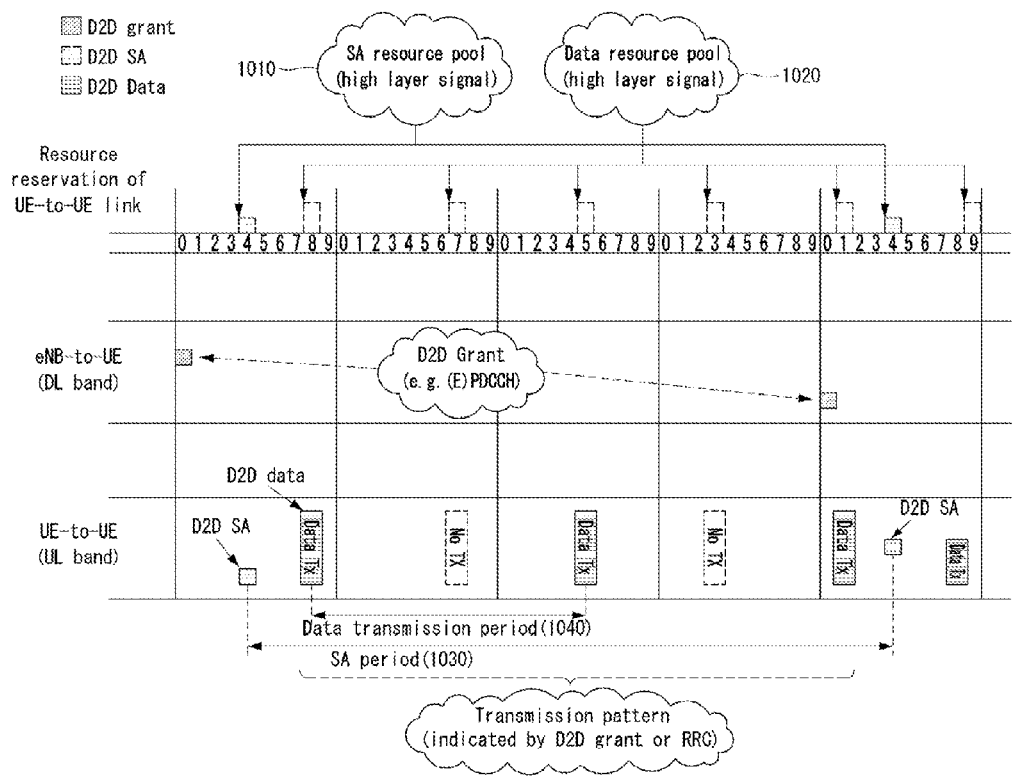

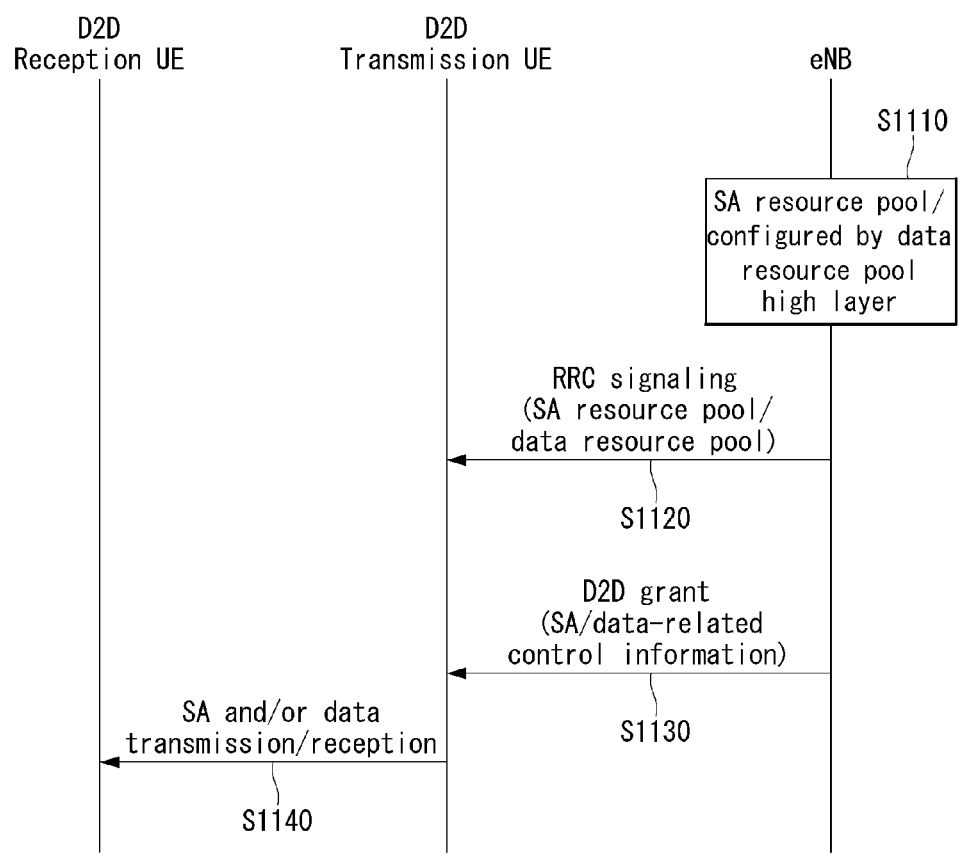

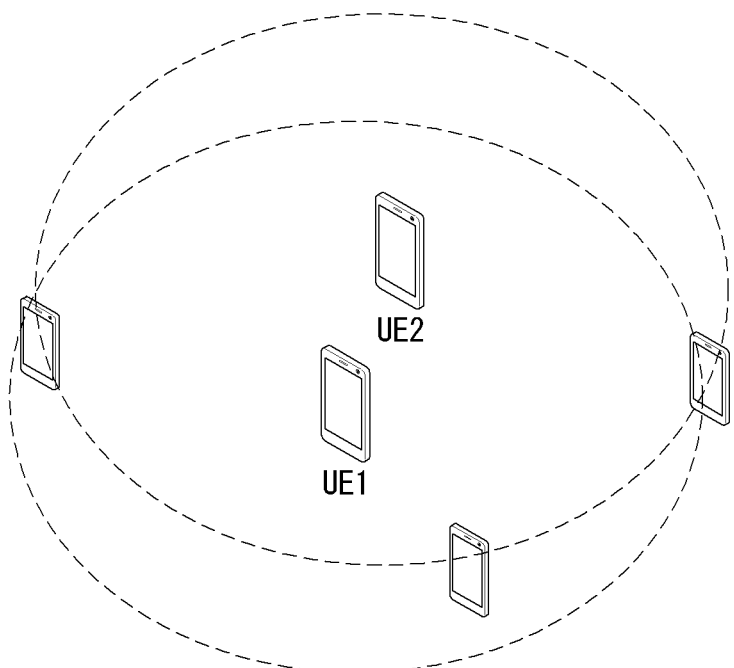
【FIG. 12】

[FIG. 13]
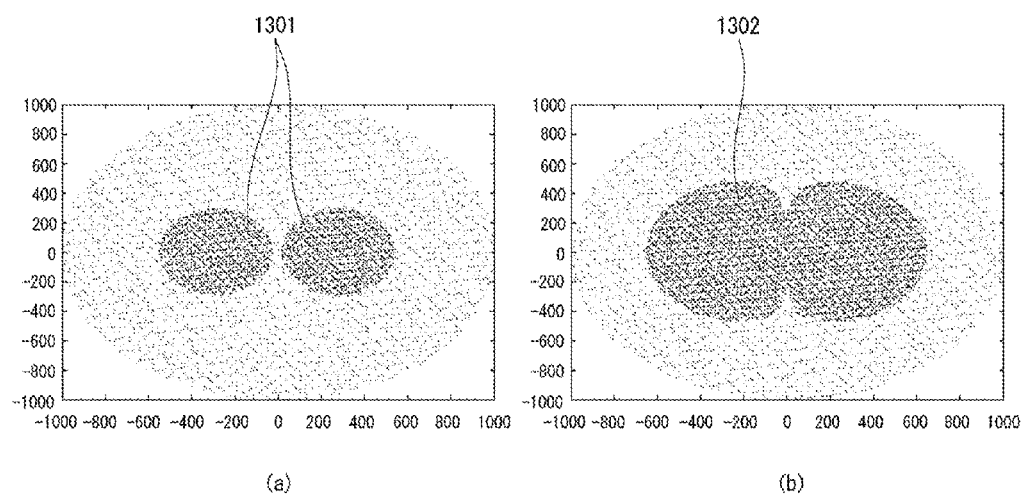

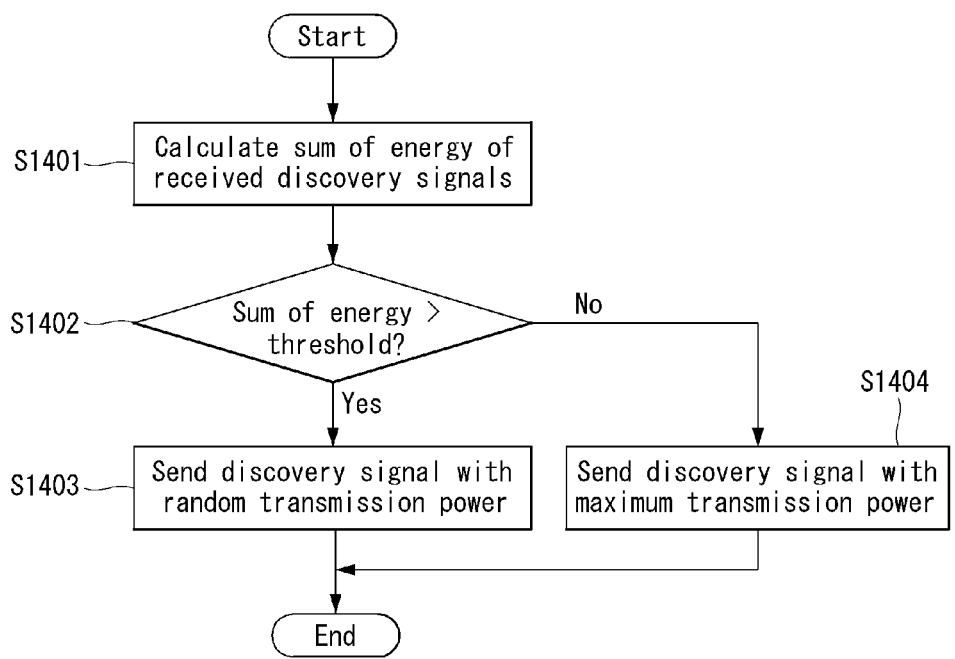
[FIG. 14]

[FIG. 15]
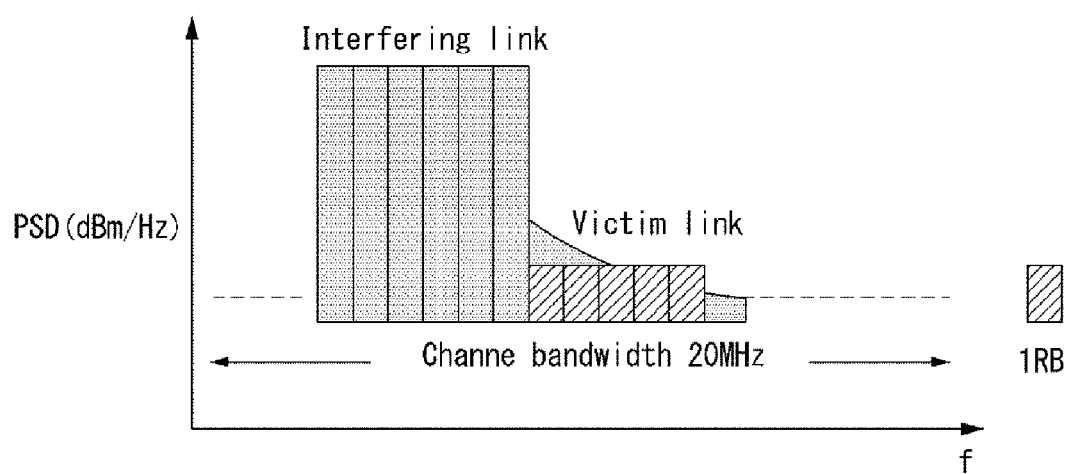

[FIG. 16]
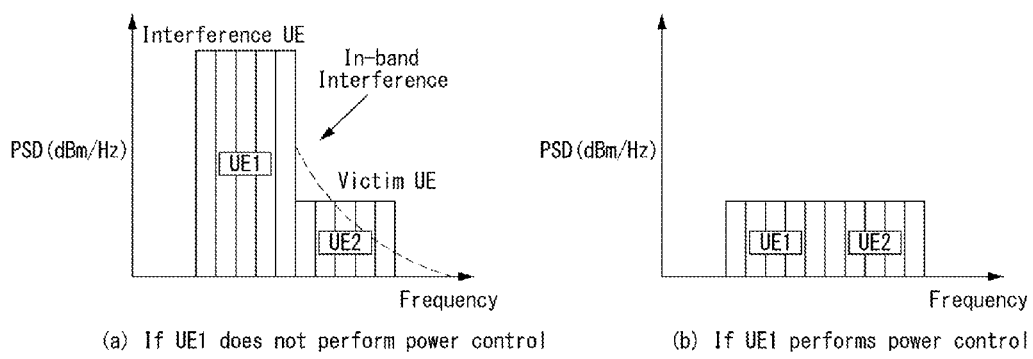
(a) If UE1 does not perform power control
(b) If UE1 performs power control

[FIG. 17]
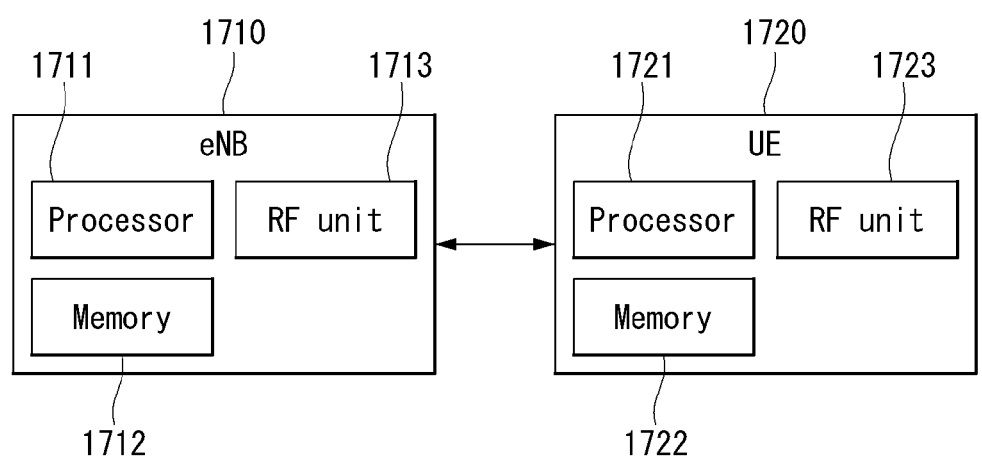

METHOD FOR CONTROLLING POWER AND APPARATUS THEREFOR IN WIRELESS COMMUNICATION SYSTEM SUPPORTING DEVICE-TO-DEVICE COMMUNICATION

CROSS-REFERENCE TO RELATED APPLICATIONS

This application is the National Stage filing under 35 U.S.C. 371 of International Application No. PCT/KR2015/007716, filed on Jul. 24, 2015, which claims the benefit of U.S. Provisional Application No. 62/028,784, filed on Jul. 24, 2014, the contents of which are all hereby incorporated by reference herein in their entirety.

TECHNICAL FIELD

The present invention relates to a wireless communication system, and more particularly, to a method for controlling sensing-based transmission power in a wireless communication system supporting device-to-device (D2D) communication and an apparatus supporting the same.

BACKGROUND ART

A mobile communication system has been developed to provide a voice service while guaranteeing activity of a user. However, the mobile communication system extends an area up to a data service as well as a voice and at present, a short phenomenon of a resource is caused due to an explosive increase of traffic and uses require a higher-speed service, and as a result, a more developed mobile communication system is required.

Requirements of a next-generation mobile communication system largely need to support accommodation of explosive data traffic, an epochal increase of transmission rate per user, accommodation of the significantly increased number of connection devices, very low end-to-end latency, and high energy efficiency. To this end, various technologies have been researched, which include dual connectivity, massive multiple input multiple output (MIMO), in-band full duplex, non-orthogonal multiple access (NOMA), super wideband supporting, device networking, and the like.

DISCLOSURE

Technical Problem

An object of the present invention is to propose a method for controlling signal transmission power of UE, which is capable of removing interference attributable to the selection of redundant resources and in-band interference in a wireless communication system supporting D2D communication.

An object of the present invention is to propose a method for adaptively controlling signal transmission power based on UEs having a high probability that a resource collision may occur.

Technical objects of the present invention are not limited to the above-described object and other technical objects that have not been described above will become evident to those skilled in the art from the following description.

Technical Solution

According to an aspect of the present invention, a method for controlling, by UE, transmission power of a physical sidelink discovery channel (PSDCH) in a wireless communication system supporting device-to-device (D2D) communication includes calculating the sum of reception intensities of PSDCHs received in a specific PSDCH reception interval and sending a PSDCH. If the sum of the reception intensities of the PSDCHs is greater than a predetermined threshold, the transmitted PSDCH may be transmitted with transmission power controlled by the UE. If the sum of the reception intensities of the PSDCHs is not greater than the predetermined threshold, the transmitted PSDCH may be transmitted with maximum transmission power.

According to an aspect of the present invention, UE controlling transmission power of a physical sidelink discovery channel (PSDCH) in D2D communication in a wireless communication system supporting device-to-device (D2D) communication includes a radio frequency (RF) unit transmitting and receiving a radio signal and a processor. The processor may be configured to calculate a sum of reception intensities of PSDCHs received in a specific PSDCH reception interval and to send a PSDCH. If the sum of the reception intensities of the PSDCHs is greater than a predetermined threshold, the transmitted PSDCH may be transmitted with transmission power controlled by the UE. If the sum of the reception intensities of the PSDCHs is not greater than the predetermined threshold, the transmitted PSDCH may be transmitted with maximum transmission power.

The controlled transmission power may be determined by multiplying the maximum transmission power by a specific value between 0 and 1.

The PSDCH reception interval may include a single discovery period.

In the first discovery period, the transmitted PSDCH may be transmitted with maximum transmission power.

The PSDCH reception interval may include subframes from a first subframe within a single discovery resource pool to a subframe prior to a subframe in which the transmitted PSDCH is transmitted.

The PSDCH reception interval may include subframes from a subframe subsequent to a subframe in which a PSDCH is most recently transmitted prior to the transmitted PSDCH to a subframe prior to a subframe in which the transmitted PSDCH is transmitted.

If the transmitted PSDCH is repeatedly transmitted in a single discovery resource pool, a first transmitted PSDCH may be transmitted with maximum transmission power.

If a PSDCH transmission resource pool and a PSDCH reception resource pool are separately configured, the sum of reception intensities of PSDCHs received in the most recent PSDCH reception resource pool prior to a PSDCH transmission resource pool to which the transmitted PSDCH belongs may be calculated.

Advantageous Effects

In accordance with an embodiment of the present invention, interference attributable to the selection of redundant resources and in-band interference can be removed in a wireless communication system supporting D2D communication through power control of UE.

Furthermore, in accordance with an embodiment of the present invention, a signal to interference plus noise ratio (SINR) can be improved by removing interference through power control of UE.

Furthermore, an embodiment of the present invention has an advantage in that it can be applied without a change in the protocol or interface for D2D communication.

The technical effects of the present invention are not limited to the above-described effects and other technical effects that have not been described above will be evidently understood by those skilled in the art from the following description.

DESCRIPTION OF DRAWINGS

The accompanying drawings, which are included to provide a further understanding of the invention and are incorporated in and constitute a part of this application, illustrate embodiments of the invention and together with the description serve to explain the principle of the invention.

FIG. 1 shows an example of the configuration of an evolved universal terrestrial radio access network (E-UTRAN) to which an embodiment of the present invention may be applied.

FIG. 2 is a diagram for illustrating physical channels used in 3GPP LTE/LTE-A systems to which an embodiment of the present invention may be applied and a common signal transmission method using the physical channels.

FIG. 3 shows the structure of a radio frame in a wireless communication system to which an embodiment of the present invention may be applied.

FIG. 4 is a diagram illustrating a resource grid for a single downlink slot in a wireless communication system to which an embodiment of the present invention may be applied.

FIG. 5 shows the structure of a downlink subframe in a wireless communication system to which an embodiment of the present invention may be applied.

FIG. 6 shows the structure of an uplink subframe in a wireless communication system to which an embodiment of the present invention may be applied.

FIG. 7 is a diagram for conceptually illustrating D2D communication in a wireless communication system to which an embodiment of the present invention may be applied.

FIG. 8 shows an example of various scenarios of D2D communication to which a method proposed by this specification may be applied.

FIG. 9 is a diagram for illustrating a distributed discovery resource allocation method in a wireless communication system to which an embodiment of the present invention may be applied.

FIG. 10 is a diagram for illustrating a signaling transmission/reception method for D2D direct communication in a wireless communication system to which an embodiment of the present invention may be applied.

FIG. 11 is a diagram for illustrating a method for transmitting downlink control information for D2D direct communication in a wireless communication system to which an embodiment of the present invention may be applied.

FIG. 12 is a diagram illustrating the state in which D2D signal transmission resources collide again each other.

FIG. 13 is a diagram illustrating the results of the simulated experiments of a discovery signal reception radius according to power control of a discovery signal.

FIG. 14 is a diagram illustrating a power control method according to an embodiment of the present invention.

FIG. 15 is a diagram illustrating in-band interference attributable to a power imbalance.

FIG. 16 is a diagram illustrating in-band interference if discovery transmission power has been controlled and if discovery transmission power has not been controlled according to an embodiment of the present invention.

FIG. 17 illustrates a block diagram of a wireless communication device according to an embodiment of the present invention.

MODE FOR INVENTION

Some embodiments of the present invention are described in detail with reference to the accompanying drawings. A detailed description to be disclosed along with the accompanying drawings are intended to describe some embodiments of the present invention and are not intended to describe a sole embodiment of the present invention. The following detailed description includes more details in order to provide full understanding of the present invention. However, those skilled in the art will understand that the present invention may be implemented without such more details.

In some cases, in order to avoid that the concept of the present invention becomes vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), or an access point (AP). Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

in order to clearly describe the present invention, 3GPP LTE/LTE-A is primarily described, but a technical feature of the present invention is not limited thereto.

General System to which Present Invention can be Applied

FIG. 1 illustrates an example of the network structure of E-UTRAN (evolved universal terrestrial radio access network) to which the present invention may be applied.

An E-UTRAN system is an advanced version of the existing UTRAN system, and may be a 3GPP LTE/LTE-A system, for example. E-UTRAN consists of eNBs that provide a control plane protocol and a user plane protocol to UEs, and the eNBs are connected via the X2 interface. The X2 user plane interface X2-U is defined between the eNBs. The X2-U interface provides non-guaranteed delivery of user plane PDUs (packet data units). The X2 control plane interface X2-CP is defined between two neighbor eNBs. The X2-CP performs the following functions: context transfer between eNBs, control of user plane tunnels between a source eNB and a target eNB, transfer of handover-related messages, uplink load management and the like. An eNB is connected to user equipment UE through a radio interface and is connected to an Evolved Packet Core (EPC) through the S1 interface. The S1 user plane interface (SI-U) is defined between the eNB and the serving gateway (S-GW). The SI control plane interface (SI-MME) is defined between the eNB and the MME (Mobility Management Entity). The S1 interface performs the following functions: EPS (Enhanced Packet System) Bearer Service Management function, NAS (Non-Access Stratum) Signaling Transport function, Network Sharing Function, MME Load balancing Function and the like. The S1 interface supports many-to-many relations between eNBs and MMEs/S-GWs.

FIG. 2 illustrates physical channels and a view showing physical channels used for in the 3GPP LTE/LTE-A system to which the present invention can be applied.

When a UE is powered on or when the UE newly enters a cell, the UE performs an initial cell search operation such as synchronization with a BS in step S201. For the initial cell search operation, the UE may receive a Primary Synchronization Channel (P-SCH) (or Primary Synchronization Signal (PSS)) and a Secondary Synchronization Channel (S-SCH) (or Secondary Synchronization Signal (SSS)) from the BS so as to perform synchronization with the BS, and acquire information such as a cell ID.

Thereafter, the UE may receive a physical broadcast channel (PBCH) from the BS and acquire broadcast information in the cell. Meanwhile, the UE may receive a Downlink Reference signal (DL RS) in the initial cell search step and confirm a downlink channel state.

The UE which completes the initial cell search may receive a Physical Downlink Control Channel (PDCCH) and a Physical Downlink Shared Channel (PDSCH) corresponding to the PDCCH, and acquire more detailed system information in step S202.

Thereafter, the UE may perform a random access procedure in steps S203 to S206, in order to complete the access to the BS. For the random access procedure, the UE may transmit a preamble via a Physical Random Access Channel (PRACH) (S203), and may receive a message in response to the preamble via the PDCCH and the PDSCH corresponding thereto (S204). In contention-based random access, a contention resolution procedure including the transmission of an additional PRACH (S205) and the reception of the PDCCH and the PDSCH corresponding thereto (S206) may be performed.

The UE which performs the above-described procedure may then receive the PDCCH/PDSCH (S207) and transmit a Physical Uplink Shared Channel (PUSCH)/Physical Uplink Control Channel (PUCCH) (S208), as a general uplink/downlink signal transmission procedure.

Control information transmitted from the UE to the BS is collectively referred to as uplink control information (UCI). The UCI includes hybrid automatic repeat and request acknowledgement/negative-acknowledgement (HARQ ACK/NACK), scheduling request (SR), channel quality information (CQI), precoding matrix indicator (PMI), rank indication (RI), etc. In the embodiments of the present invention, CQI and/or PMI are also referred to as channel quality control information.

In general, although a UCI is periodically transmitted via a PUCCH in the LTE system, this may be transmitted through a PUSCH if control information and traffic data are simultaneously transmitted. In addition, a UCI may be aperiodically transmitted via a PUSCH according to a network request/instruction.

FIG. 3 illustrates the structure of a radio frame in a wireless communication system to which an embodiment of the present invention can be applied.

3GPP LTE/LTE-A support a radio frame structure type 1 which may be applicable to Frequency Division Duplex (FDD) and a radio frame structure which may be applicable to Time Division Duplex (TDD).

FIG. 3(a) illustrates the radio frame structure type 1. A radio frame consists of 10 subframes. One subframe consists of 2 slots in a time domain. The time taken to send one subframe is called a Transmission Time Interval (TTI). For example, one subframe may have a length of 1 ms, and one slot may have a length of 0.5 ms.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 3(b) illustrates the frame structure type 2. The radio frame structure type 2 consists of 2 half frames. Each of the half frames consists of 5 subframes, a Downlink Pilot Time Slot (DwPTS), a Guard Period (GP), and an Uplink Pilot Time Slot (UpPTS). One subframe consists of 2 slots. The DwPTS is used for initial cell search, synchronization, or channel estimation in UE. The UpPTS is used for channel estimation in an eNB and to perform uplink transmission synchronization with UE. The guard period is an interval in which interference generated in uplink due to the multi-path delay of a downlink signal between uplink and downlink is removed.

The structure of a radio frame is only one example. The number of subcarriers included in a radio frame or the number of slots included in a subframe and the number of OFDM symbols included in a slot may be changed in various ways.

FIG. 4 is a diagram illustrating a resource grid for one downlink slot in a wireless communication system to which an embodiment of the present invention can be applied.

Referring to FIG. 4, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes 12×7 resource elements. The number of RBs N^DL included in a downlink slot depends on a downlink transmission bandwidth.

The structure of an uplink slot may be the same as that of a downlink slot.

FIG. 5 illustrates the structure of a downlink subframe in a wireless communication system to which an embodiment of the present invention can be applied.

Referring to FIG. 5, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

A PDCCH may carry information about the resource allocation and transport format of a downlink shared channel (DL-SCH) (this is also called an "downlink grant"), resource allocation information about an uplink shared channel (UL-SCH) (this is also called a "uplink grant"), paging information on a PCH, system information on a DL-SCH, the resource allocation of a high layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or an aggregation of some contiguous CCEs. A CCE is a logical allocation unit that is used to provide a PDCCH with a coding rate according to the state of a radio channel. A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to UE and attaches a Cyclic Redundancy Check (CRC) to control information. A unique identifier (a Radio Network Temporary Identifier (RNTI)) is masked to the CRC depending on the owner or use of a PDCCH. If the PDCCH is a PDCCH for specific UE, an identifier unique to the UE, for example, a Cell-RNTI (C-RNTI) may be masked to the CRC. If the PDCCH is a PDCCH for a paging message, a paging indication identifier, for example, a Paging-RNTI (P-RNTI) may be masked to the CRC. If the PDCCH is a PDCCH for system information, more specifically, a System Information Block (SIB), a system information identifier, for example, a System Information-RNTI (SI-RNTI) may be masked to the CRC. A Random Access-RNTI (RA-RNTI) may be masked to the CRC in order to indicate a random access response which is a response to the transmission of a random access preamble by UE.

FIG. 6 illustrates the structure of an uplink subframe in a wireless communication system to which an embodiment of the present invention can be applied.

Referring to FIG. 6, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Device-to-Device (D2D) Communication

A Device-to-Device (D2D) communication technology means a scheme in which terminals which are geographically proximate to each other directly communicate with each other without using an infrastructure such as the base station. As the D2D communication technology, technologies primarily using an unlicensed frequency band have been developed, such as Wi-Fi Direct and Bluetooth. However, development and standardization of the D2D communication technology using a licensed frequency band are in progress for the purpose of improving frequency use efficiency of a cellular system.

In general, the D2D communication as a term which denotes communication between things or the M2M communication is limitedly used, but the D2D communication in the present invention may include all of communication among various types of devices having a communication function, such as a smart phone or a personal computer in addition to a simple device having the communication function.

FIG. 7 is a diagram for conceptually describing D2D communication in the wireless communication system to which the present invention can be applied.

FIG. 10(a) illustrates a base station based communication scheme in the related art and terminal 1 (UE 1) may transmit data to the base station on the uplink and the base station may transmit data to terminal 2 (UE 2) on the downlink. The communication scheme may be referred to as an indirect communication scheme through the base station. In the indirect communication scheme, a Un link (as a link between the base stations or a link between the base station and a repeater, may be referred to as a backhaul link) which is a link defined in a wireless communication system in the related art and/or a Un link (as a link between the base station and the terminal or a link between the repeater and the terminal, may be referred to as an access link) may be associated.

FIG. 7(b) as one example of the D2D communication illustrates a UE-to-UE communication scheme and UE-to-UE data exchange may be performed without using the base station. The communication scheme may be referred to as a direct communication scheme between the devices. The D2D direct communication scheme has advantages including a decrease in latency, use of less radio resources, and the like as compared with the indirect communication scheme through the base station.

FIG. 8 illustrates one example of various scenarios of D2D communication to which a method proposed by the present specification can be applied.

A scenario of the D2D communication may be largely divided into (1) an Out-of-coverage network, (2) a partial-coverage network, and (3) an in-coverage network according to whether UE 1 and UE 2 are positioned in coverage/out of coverage.

The case of the in-coverage network may be divided into an in-coverage-single-cell and an in-coverage-multi-cell according to the number of cells corresponding to the coverage of the base station.

FIG. 8(a) illustrates one example of an Out-of-coverage network scenario of the D2D communication.

An out-of-coverage network scenario represents D2D communication between D2D terminals without control of the base station.

In FIG. 8(a), it may be illustrated that only UE 1 and UE 2 are present and UE 1 and UE 2 perform direct communication.

FIG. 8(b) illustrates one example of a partial-coverage network scenario of the D2D communication.

The partial-coverage network scenario represents performing the D2D communication between the D2D terminal positioned in the network coverage and the D2D terminal positioned out of the network coverage.

In FIG. 8(b), it may be illustrated that UE 1 positioned in the network coverage and UE 2 positioned out of the network coverage communicate with each other.

FIG. 8(c) illustrates one example of an in-coverage-single-cell scenario and FIG. 8(d) illustrates one example of an in-coverage-multi-cell scenario.

The in-coverage network scenario represents that the D2D terminals perform the D2D communication through the control of the base station in the network coverage.

In FIG. 8(c), UE 1 and UE 2 are positioned within the same network coverage (alternatively, cell) and perform the D2D communication under the control of the base station.

In FIG. 8(d), UE 1 and UE 2 are positioned in the network coverage, but positioned in different network coverage. In addition, UE 1 and UE 2 perform the D2D communication under the control of the base station managing each network coverage.

Hereinafter, the D2D communication will be described in more detail.

The D2D communication may operate in the scenario illustrated in FIG. 8, but in general, the D2D communication may operate in the coverage and out of the coverage. A link used for the D2D communication (UE-to-UE direct communication) may be referred to as D2D link, direct link, or sidelink, but hereinafter, the link used for the D2D communication will be collectively called and described as the sidelink for easy description.

Sidelink transmission may operate in an uplink spectrum in the case of FDD and operate in an uplink (alternatively, downlink) subframe in the case of TDD. Time division multiplexing (TDM) may be used for multiplexing the sidelink transmission and uplink transmission.

The sidelink transmission and the uplink transmissions do not simultaneously occur. The sidelink subframe partially or totally overlapped with the uplink subframe or UpPTS used for the uplink transmission, the sidelink transmission does not occur. Further, sidelink transmission and reception do not also simultaneously occur.

In the case of a structure of a physical resource used for the sidelink transmission, a structure of an uplink physical resource may be similarly used. However, a last symbol of the sidelink subframe is constituted by a guard period not to be used for the sidelink transmission.

The sidelink subframe may be configured by an extended CP or a normal CP.

The D2D communication may be largely divided into discovery, direct communication, and synchronization.

1) Discovery

The D2D discovery may be applied in the network coverage (including Inter-cell and Intra-cell). In inter-cell discovery, both synchronous and asynchronous cell deployments may be considered. The D2D discovery may be used for various commercial purposes including advertisement, coupon issue, friend finding, and the like for a terminal within a proximate area.

When UE 1 plays a role of transmitting a discovery message, UE 1 transmits the discovery message and UE 2 receives the discovery message. Transmission and reception roles of UE 1 and UE 2 may be exchanged with each other. The discovery message transmitted from UE 1 may be received by one or more UE(s) such as UE 2.

The discovery message may include a single MAC PDU and herein, the single MAC PDU may include a UE identifier (ID) and an application ID.

As a channel for transmitting the discovery message, a physical sidelink discovery channel (PDSCH) may be defined. As a structure of the PDSCH, a PUSCH structure may be reused.

As a resource allocation method for the D2D discovery, two types (Type 1 and Type 2) may be used.

In the case of Type 1, the base station may allocate a resource for transmitting the discovery message by a non-UE specific scheme.

In detail, a radio resource pool for discovery transmission and reception constituted by a plurality of subframe sets and a plurality of resource block sets is allocated within a specific period (hereinafter, referred to as 'discovery period') and discovery transmission UE arbitrarily selects a specific resource in the radio resource pool and thereafter, transmits the discovery message.

The periodic discovery resource pool may be allocated for transmitting a discovery signal by a semi-static scheme. Configuration information of the discovery resource pool for the discovery transmission includes the discovery period, subframe set and resource block set information which may be used for transmitting the discovery signal within the discovery period, and the like. The configuration information of the discovery resource pool may be transmitted to the UE by high layer signaling. In the case of in-coverage UE, the discovery resource pool for the discovery transmission may be configured by the base station and notified to the UE by using RRC signaling (e.g., a system information block (SIB)).

The discovery resource pool allocated for the discovery within one discovery period as a time-frequency resource block having the same size may be multiplexed by TDM and/or FDM and the time-frequency resource block having the same size may be referred to as 'discovery resource'. The discovery resource may be divided by the unit of one subframe and include two physical resource blocks (PRBs) per slot in each subframe. One discovery resource may be used for transmitting a discovery MAC PDU by one UE.

Further, the UE may repeatedly transmit the discovery signal within the discovery period for transmitting one transport block. The MAC PDU transmitted by one UE may be repeatedly (e.g., repeatedly four times) contiguously or non-contiguously within the discovery period (that is, the radio resource pool). The number of transmission times of the discovery signal for one transport block may be transmitted to the UE by the high layer signaling.

The UE may arbitrarily select a first discovery resource in a discovery resource set which may be used for repeated transmission of the MAC PDU and other discovery resources may be determined in association with the first discovery resource. For example, a predetermined pattern may be previously set and the next discovery resource may be determined according to the previously set pattern according to a position of the discovery resource which the UE first selects. Or, the UE may arbitrarily select each discovery resource in the discovery resource set which may be used for the repeated transmission of the MAC PDU.

In Type 2, the resource for transmitting the discover message is UE-specifically allocated. Type 2 is subdivided into Type 2A (Type-2A) and Type 2B (Type-2B). Type 2A is a scheme in which the base station allocates the resource every transmission instance of the discovery message within the discovery period and Type 2B is a scheme in which the base station allocates the resource by a semi-persistent scheme.

In the case of Type 2B, RRC_CONNECTED UE requests allocation of the resource for transmitting the D2D discovery message to the base station through the RRC signaling. In addition, the base station may allocate the resource through the RRC signaling. When the UE is transitioned to the RRC_IDLE state or when the base station withdraws the resource allocation through the RRC signaling, the UE release a transmission resource which is allocated most recently. As described above, in the case of Type 2B, the radio resource may be allocated by the RRC signaling and activation/deactivation of the radio resource allocated by the PDCCH may be determined.

The radio resource pool for receiving the discovery message may be configured by the base station and notified to the UE by using the RRC signaling (e.g., the system information block (SIB)).

The UE that receives the discovery message monitors both the discovery resource pools of Type 1 and Type 2 in order to receive the discovery message.

2) Direct Communication

An application area of the D2D direct communication includes even a network coverage edge-of-coverage area as well as network in-coverage and out-of-coverage areas. The D2D direct communication may be used for a purpose such as public safety, or the like.

When UE 1 plays a role of transmitting direct communication data, UE 1 transmits the direct communication data and UE 2 receives the direct communication data. Transmission and reception roles of UE 1 and UE 2 may be exchanged with each other. The direct communication transmission from UE 1 may be received by one or more UE(s) such as UE 2.

The D2D discovery and the D2D communication may not be associated with each other but independently defined. That is, in groupcast and broadcast direct communication, the D2D discovery is not required. As such, when the D2D discovery and the D2D direct communication are independently defined, the UEs need not recognize adjacent UE. In other words, in the case of the groupcast and broadcast direct communication, all receiving UEs in a group are not required to be proximate to each other.

As a channel for transmitting the D2D direct communication data, a physical sidelink shared channel (PSSCH) may be defined. Further, as a channel for transmitting control information (e.g., scheduling assignment (SA), a transmission format, and the like for transmitting the direct communication data) for the D2D direct communication, a physical sidelink control channel (PSCCH) may be defined. As the structures of the PSSCH and the PSCCH, the PUSCH structure may be reused.

As a resource allocation method for the D2D direct communication, two modes (mode 1 and mode 2) may be used.

Mode 1 represents a scheme in which the base station schedules a resource used for transmitting data or control information for the D2D direct communication to the UE. In the in-coverage, mode 1 is applied.

The base station configures the resource pool required for the D2D direct communication. Herein, the resource pool required for the D2D communication may be divided into a control information pool and a D2D data pool. When the base station schedules control information and D2D data transmission resources within a pool configured for transmitting D2D UE by using the PDCCH or ePDCCH, the transmitting D2D UE transmits control information and D2D data by using an allocated resource.

The transmitting UE requests a transmission resource to the base station and the base station schedules resources for transmitting the control information and the D2D direct communication data. That is, in the case of mode 1, the transmitting UE needs to be in the RRC_CONNECTED state in order to perform the D2D direct communication. The transmitting UE transmits the scheduling request to the base station and thereafter, the buffer status report (BSR) procedure is performed so that the base station determines the quantity of resources requested by the transmitting UE.

When receiving UEs monitor the control information pool and decodes control information associated therewith, the receiving UEs may selectively decode D2D data transmission associated with the corresponding control information. The receiving UE may not decode the D2D data pool according to a control information decoding result.

Mode 2 represents a scheme in which the UE arbitrarily selects a specific resource in the resource pool in order to transmit data or control information for the D2D direct communication. In the out-of-coverage and/or edge-of-coverage, mode 2 is applied.

In mode 2, the resource pool for transmitting the control information and/or the resource pool for transmitting the D2D direct communication data may be pre-configured or semi-statically configured. The UE receives the configured resource pool (a time and a frequency) and selects the resource for the D2D communication transmission. That is, the UE may select the resource for transmitting the control information in the control information resource pool in order to transmit the control information. Further, the UE may select the resource in the data resource pool in order to transmit the D2D direct communication data.

In D2D broadcast communication, the control information is transmitted by a broadcasting UE. The control information indicates explicitly and/or implicitly a position of a resource for data reception in association with the physical channel (that is, PSSCH) transporting the D2D direct communication data.

3) Synchronization

A D2D synchronization signal/sequence (D2DSS) may be used for the UE to acquire time-frequency synchronization. In particular, since the control of the base station is impossible out of the network coverage, a new signal and a new procedure for establishing UE-to-UE synchronization may be defined. The D2D synchronization signal/sequence (D2DSS) may be referred to as a sidelink synchronization signal.

A UE that periodically transmits the D2D synchronization signal/sequence (D2DSS) may be referred to as a D2D synchronization source or a sidelink synchronization source. When the D2D synchronization source is the base station, a structure of the D2D synchronization signal/sequence (D2DSS) may be the same as the PSS/SSS. When the D2D synchronization source is not the base station (for example, the UE or a global navigation satellite system (GNSS)), the structure of the D2D synchronization signal/sequence (D2DSS) may be newly defined.

The D2D synchronization signal/sequence (D2DSS) is periodically transmitted with a period which is not smaller than 40 ms. Each UE may have multiple physical-layer D2D synchronization identities. The physical-layer D2D synchronization identity may be referred to as a physical-layer sidelink synchronization identity or just referred to as a D2D synchronization identity.

The D2D synchronization signal/sequence (D2DSS) includes a D2D primary synchronization signal/sequence and a D2D secondary synchronization signal/sequence. The D2D primary synchronization signal/sequence and the D2D secondary synchronization signal/sequence may be referred to as a primary sidelink synchronization signal (PSSS) and a secondary sidelink synchronization signal (SSSS), respectively.

Before transmitting the D2D synchronization signal/sequence (D2DSS), the UE may first search the D2D synchronization source. In addition, when the D2D synchronization source is searched, the UE may acquire the time-frequency synchronization through the D2D synchronization signal/sequence received from the searched D2D synchronization source. In addition, the corresponding UE may transmit the D2D synchronization signal/sequence.

Further, a channel may be required, which is used for purpose of transferring system information and synchronization-related information used for the UE-to-UE communication together with synchronization and the channel for the purpose may be defined. The channel may be referred to as a physical D2D synchronization channel (PD2DSCH) or a physical sidelink broadcast channel (PSBCH).

Hereinafter, direct communication between two devices in the D2D communication is described as an example for clarity, but the scope of the present invention is not limited thereto and the same principle described in the present invention may be applied even to D2D communication among two or more plural devices.

D2D Discovery

Hereinafter, in the present description, a signal (alternatively, message) which the UEs periodically transmit for the D2D discovery may be referred to as the discovery message, the discovery signal, a beacon, and the like. Hereinafter, the discovery message, the discovery signal, the beacon, and the like are collectively called the discovery message.

In distributed discovery, as a resource used for the UE to transmit and receive the discovery message, a dedicated resource may be periodically allocated apart from a cellular resource. The dedicated resource will be described below with reference to FIG. 9.

FIG. 9 is a diagram for describing a distributed discovery resource allocating method in the wireless communication system to which the present invention can be applied.

Referring to FIG. 9, in a distributed discovery scheme, a discovery subframe (that is, a 'discovery resource pool') 901 for discovery among all cellular uplink frequency-time resources is fixedly (alternatively, dedicatedly) allocated and the residual area is constituted by an LTE uplink wide area network (WAN) subframe area 902 in the related art. The discovery resource pool may be constituted by one or more subframes.

The discovery resource pool may be periodically allocated at a predetermined time interval (that is, a 'discovery period'). Further, the discovery resource pool may be repeatedly configured within one discovery period.

FIG. 9 illustrates an example in which the discovery resource pool is allocated with a discovery period of 10 sec and 64 consecutive subframes are allocated to the respective discovery resource pools. However, the size of the time/frequency resource of the discovery period and the discovery resource pool corresponds to one example and the present invention is not limited thereto.

The UE autonomously selects the resource (that is, the 'discovery resource') for transmitting the discovery message thereof in the dedicatedly allocated discovery pool and transmits the discovery message through the selected resource.

D2D Direct Communication

The D2D control information may be referred to as sidelink control information (SCI) or scheduling assignment (SA). As described above, the D2D control information may be transmitted on the PSCCH and the D2D data may be transmitted on the PSSCH. Hereinafter, the D2D control information will be referred to as SA.

FIG. 10 is a diagram for describing a method for transmitting/receiving signaling for D2D direct communication in the wireless communication system to which the present invention can be applied.

FIG. 10 illustrates a method that performs the D2D communication by transmitting/receiving a D2D operating procedure in a D2D operating procedure (D2D communication Mode 1) by the control of the base station and information associated therewith.

As illustrated in FIG. 10, a scheduling assignment (SA) resource pool 1010 and/or a data resource pool 1020 associated with the D2D communication may be pre-configured and the pre-configured resource pool may be transmitted from the base station to the D2D UEs through the high layer signaling.

The high layer signaling may be the RRC signaling.

An expression of 'A and/or B' used in the specification may be interpreted as a concept meaning at least one of A and B (indicating A, B, or A & B).

The SA resource pool and/or data resource pool means a resource reserved for the D2D (UE-to-UE) link or the D2D communication.

The UE-to-UE link may be expressed as sidelink.

In detail, the SA resource pool means a resource area to transmit the SA and the data resource pool means a resource area to transmit the D2D data.

The SA may be transmitted according to an SA period 1030 and the D2D data may be transmitted according to a data transmission period 1040.

The SA period and/or the data transmission period may be transmitted from the base station to the D2D UE through a D2D grant.

Alternatively, the SA period may be transmitted through the D2D grant and the data transmission period may be transmitted through the SA.

Herein, the D2D grant represents downlink control information (DCI) required for transmitting the SA and the D2D data transmitted to the D2D UE by the base station.

The D2D grant may be expressed as DCI format 5 and transmitted through the physical layer channels including the PDCCH, the EPDCCH, and the like or an MAC layer channel.

Further, the D2D grant may include information associated with SA transmission and information associated with data transmission.

The SA may include a resource allocation (RA), an MCS, a new data indicator (NDI), a redundancy version (RV), and the like as an example.

As described above, the SA resource pool for the SA transmission may be transmitted through the RRC signaling.

Further, the SA may be transmitted through the Physical Sidelink Control Channel (PSCCH) and the D2D data may be transmitted through the Physical Sidelink Shared Channel (PSSCH).

The D2D transmitting UE may receive SA information, in particular, resource allocation (RA) information (hereinafter, referred to as 'SA RA' information) in which the SA may be transmitted, from the base station through the D2D grant.

In this case, the D2D transmitting UE may transmit the SA RA information received from the base station to the D2D receiving UE as it is or generate new SA RA information by referring to the received SA RA information and thereafter, transmit the newly generated SA RA information to the D2D receiving UE.

Herein, when the D2D transmitting UE newly generates the SA RA, the D2D transmitting UE needs to perform resource allocation of the SA only within the resource pool indicated by a D2D grant RA.

That is, the D2D transmitting UE may transmit the SA by selecting only a partial resource area (SA RA) in the resource area (D2D grant RA) which eNB allows to be used.

Alternatively, contrary to this, the D2D transmitting UE may use the D2D grant RA allocated by the eNB as it is.

FIG. 11 is a diagram for describing a method for transmitting downlink control information for D2D direct communication in the wireless communication system to which the present invention can be applied.

First, the SA resource pool and/or D2D data resource pool associated with the D2D communication are/is configured by a high layer (S1110).

Thereafter, the base station transmits the SA resource pool and/or D2D data resource pool to the D2D UE through the high layer signaling (S1120).

Thereafter, the base station transmits control information associated with the SA and/or control information associated with the D2D data to the D2D transmitting UE through the D2D grant separately or together (S1130). The control information includes scheduling information of the SA and/or D2D data in the SA resource pool and/or D2D data resource pool. The control information may include the RA, the MCS, the NDI, the RV, and the like as one example.

Thereafter, the D2D transmitting UE transmits the SA and/or D2D data to the D2D receiving UE based on the information received in step S1130 (S1140).

The SA transmission and the D2D data transmission may be simultaneously performed or the D2D data may be transmitted after the SA is transmitted.

Meanwhile, although not illustrated in FIG. 11, the D2D transmitting UE requests a transmission resource (that is, a PSSCH resource) for the D2D data to the base station and the base station may schedule resources for transmitting the SA and the D2D data. To this end, the buffer status report (BSR) procedure may be performed so that the D2D transmitting UE transmits the scheduling request (SR) to the base station and thereafter, the base station determines the quantity of resources requested by the D2D transmitting UE.

Herein, Since the SR is the SR for requesting allocation of not the PUSCH resource but the PSSCH resource, the SR may be distinguished from the SR for requesting the PUSCH resource. To this end, in order to distinguish the SR for the PSSCH from the SR for the PUSCH, a PUCCH resource index (that is, the PRB in which the SR is transmitted), a cyclic shift (CS) applied to the basic sequence (e.g., ZC sequence) for frequency domain spread of the SR, and an orthogonal code (OC) for time domain spread of the SR may be differently configured.

When the D2D Rx UEs monitor the control information pool and decodes control information associated therewith, the D2D Rx UEs may selectively decode D2D data transmission associated with the corresponding control information.

The D2D grant serves to allocate the resources which the D2D Tx UE requires for transmitting the SA and the data and transfer the control information including the MCS, and the like, that is, the scheduling information, as described above.

Further, since the SCI is used for scheduling the PSSCH from the viewpoints of the D2D Tx UE and the D2D Rx UE, a DCI format for the D2D grant proposed in the present invention may be used for scheduling the PSSCH and include field information of the SCI.

The DCI format for the D2D grant (alternatively, the sidelink grant) includes both the scheduling for the SA and the data as described above, but a resource allocation assignment/allocation (RA) field (alternatively, information) for the SA and an RA field (alternatively, information) for the data may be distinguished from each other.

For example, the DCI format for the D2D grant may be constituted by a frequency hopping flag (FH) field, a resource allocation (RA) field for the D2D SA, a first RA field for the D2D data, a second RA field for the D2D data, a TPC field, and a zero padding (ZP) bit(s) (a case in which the ZP bit(s) is(are) present).

The FH field indicates whether frequency hopping is applied at the time of transmitting the SA and the data. Since the FH field may be commonly applied to the SA transmission and the data transmission, the FH field may be constituted by one field.

For example, when an FH field value is '1', the D2D Tx UE performs frequency hopping transmission at the time of transmitting the SA and the data and when the FH field value is '0', the D2D Tx UE does not perform the frequency hopping transmission at the time of transmitting the SA and the data.

The SA RA field (alternatively, a PSCCH RA field, a resource field for the PSCCH) indicates resource information for the SA transmission. That is, the SA RA field indicates scheduling information (that is, resource information) for PSCCH transmission. Therefore, the D2D Tx UE transmits the SA (that is, the PSCCH) in a resource indicated by the SA RA field.

Herein, the SA RA field may also include information (alternatively, an index) for deriving a time for the SA transmission and/or a position of the frequency resource area.

For example, the SA RA field may announce a start position (that is, the index) of the resource for the SA transmission. In other words, the SA RA field may indicate a start index of a subframe and/or a resource block in which the SA is transmitted.

Further, the D2D Tx UE may derive a time resource (e.g., a subframe index) and/or a frequency resource (e.g., a resource block index) for the SA transmission by using a predetermined function (equation) based on the information included in the SA RA field.

The resource allocation information for the D2D data transmission may be constituted by a D2D data first RA field (alternatively, a first PSSCH RA field, a resource block allocation and hopping resource allocation field), a D2D data second RA field (alternatively, a second PSSCH RA field, a time resource pattern field).

The D2D data first RA field indicates the resource information (e.g., the resource block) for the D2D data transmission in the frequency domain. That is, the D2D data first RA field indicates the scheduling information in the frequency domain for the PSSCH transmission. Therefore, the D2D Tx UE transmits the D2D data (that is, the PSSCH) in a frequency resource indicated by the D2D data first RA field).

For example, the D2D data first RA field may indicate a start position (that is, a start resource block index) of the resource block for the D2D data transmission and the length of the allocated resource block by using a resource indication value (RIV) like a UL RA scheme.

Further, the D2D data first RA field may separately and announce the start position (that is, the start resource block index) and an end position (that is, a last resource block index) of the resource block for the D2D data transmission as separate fields (alternatively, information). In this case, an additional bit (e.g., 1 bit) may be further required.

The D2D data second RA field indicates resource information (e.g., the subframe) used for the D2D data transmission in the time domain. That is, the D2D data second RA field indicates the scheduling information in the time domain for the PSSCH transmission. Therefore, the D2D Tx UE transmits the D2D data (that is, the PSSCH) in a time resource indicated by the D2D data first RA field.

For example, the D2D data second RA field may indicate a subframe pattern (that is, a time resource pattern) to be used for the D2D data transmission. That is, the D2D data second RA field may include information indicating the time resource pattern used for the PSCCH transmission.

Herein, the D2D data second RA field may indicate any one pattern of a plurality of predetermined time resource patterns. For example, n subframe patterns (expressed by a bitmap) may be pre-defined like SF pattern #0(10001010), SF pattern #1(00111001), . . . , SF pattern #n(10011001) and the D2D data second RA field may indicate any one subframe pattern of n defined subframe patterns. Herein, a value of '1' of the bitmap may mean that the D2D data is transmitted in a corresponding subframe and a value of '0' may mean that the D2D data is not transmitted in the corresponding subframe. Further, the values of the bitmap may have meanings contrary thereto.

A TPC field indicates transmission power for the SA and data transmission in the D2D Tx UE. That is, the TPC field indicates transmission power information of the PSCCH and the PSSCH.

The TPC field may be constituted by one field. As such, when the TPC field is constituted by one field, the TPC field value is commonly applied to the transmission power for the SA transmission and the transmission power for the data transmission.

The ZP may be filled with the control information, not used, or not present as necessary. That is, when the ZP is not required, the ZP may be omitted.

Each field order and a bit count of each bit of the DCI format exemplified as above are just one example for easy description and may be modified.

Meanwhile, as compared with DCI format 0 given above, the DCI format for the D2D grant exemplified as above may not include the MCS field.

When the eNB announces the MCS value to the D2D Tx UE, the MCS field needs to be present in the DCI format for the D2D grant. However, the D2D Tx UE may autonomously determine the MCS value or the MCS value may be transferred through the higher layer signaling (e.g., the RRC signaling) or determined as a pre-fixed value. Accordingly, the D2D grant does not include the MCS field.

Further, the DCI format for the D2D grant exemplified as above may not include even the NDI field and the RV field. Similarly to the above, the D2D Tx UE may autonomously determine the NDI and RV values or the NDI and RV values may be transferred through the higher layer signaling (e.g., the RRC signaling) or determined as pre-fixed values.

Adaptive Power Control Method Based on Sensing for Reducing D2D Interference

In this specification, a beacon signal or discovery message/signal (i.e., a PSDCH) transmitted for UE discovery by D2D UE is generally referred to as a "discovery signal", for convenience of description. Furthermore, such a discovery signal or control information (i.e., PSCCH) or direct communication data (i.e., PSDCH) for direct communication is generally referred to as a "D2D signal."

D2D communication (i.e., D2D discovery and D2D direct communication) can obtain low delay, low energy consumption, high spectrum efficiency, and high data performance compared to existing cellular communication through D2D direct communication.

In the case of D2D communication, a cellular uplink frequency is used. If a network topology is taken into consideration, in the case of existing cellular communication, reception corresponds to only a single eNB. In contrast, in the case of D2D communication, if N UEs are present, all of the N UEs may become transmitters and may also operate as receivers. Accordingly, in D2D communication, if N UEs are present, the number of transmitters is N and the number of receivers is also N. In such a case, a total number of D2D radio links are N^2−N, which increases in the form of polynomial.

Furthermore, in the case of D2D discovery, a method for establishing synchronization based on the downlink signal of an eNB is assumed. In such a case, UEs perform discovery in such a way as to wake up at a predetermined time and to send or receive beacon signals (i.e., discovery signals/messages or PSDCHs) at the same time. If UEs wake up only at a predetermined time according to synchronization as described above, energy-efficient D2D search is possible and energy can be reduced compared to an asynchronization method.

If UEs perform transmission according to synchronization, however, interference may occur because the UEs perform transmission at the same time and UEs perform reception at the same time. In this case, the influence of interference may be increased due to transmission through many links. As a result, if such pieces of interference increase, D2D discovery performance may be deteriorated. To reduce interference in such D2D links becomes a scheme for enhancing the entire D2D system performance.

There is an advantage in that frequency efficiency is increased because the same resources are spatially reused, but if the same many resources are used, a probability that D2D interference may occur is increased because a collision attributable to the selection of redundant resources is generated. Accordingly, resource reuse and interference have a trade-off relation. There is a need for a method capable of controlling interference while spatially reusing resources.

Furthermore, although good resources not having interference are sensed and low interference resources are selected, if the density of UEs is a very high hot spot, interference attributable to the use of the same resources may occur because the distance between D2D UEs is very close. If the mobility of UE is taken into consideration, UEs using the same resources may access and generate interference because the UE always freely moves. Furthermore, when nearby UEs perform sensing, similar results may be obtained, and there is a high probability that interference may occur because the nearby UEs select the same resources.

Accordingly, recently, a method for randomly selecting, by UEs, discovery resources in a resource pool that is periodically allocated other than a method for selecting resources based on sensing is being discussed. As a result, if D2D discovery is performed in the RRC_IDLE state, that is, the direction defined in the current standard, when UEs moves to which place cannot be known, and the density of UEs for each cell/sector cannot also be checked. Accordingly, it is impossible to adaptively allocate D2D discovery resources to each cell depending on the density of UEs. In such a case, if many UEs select resources greater than predetermined resources at the same time, a collision may occur.

Furthermore, if a public-safety environment being discussed in the current standard is taken into consideration, when an eNB is not present (e.g., in the case of out-of-coverage), all of UEs cannot perform cellular communication and thus perform D2D discovery for D2D communication. Accordingly, severe interference may occur because many UEs greater than predetermined resources participate in D2D discovery.

In the case of D2D communication, a distributed method different from a centralized method for cellular communication is taken into consideration. In the case of the centralized method, an eNB may allocate proper resource and power to UEs, but there is a need for signaling overhead for coordination between the UEs and additional resources therefor. More specifically, in the case of D2D communication, the centralized method is not suitable if signaling overhead is taken into consideration because an environment including many UEs and mobility is taken into consideration. For such a reason, in the case of current D2D discovery, distributed resources and power allocation are taken into consideration.

In the case of the distributed method, UEs do not mutually recognize interference generated by surrounding UEs attributable to the use of resources in which a collision has occurred because a central controller, such as an eNB for interference control or resource allocation, is not present. Such pieces of interference increase in proportion to the number of UEs which use resources in which a collision has occurred, and are accumulated and represented as the sum of pieces of generated interference. If such interference increases, there is a problem in that UE discovery performance is deteriorated because the received beacon signal to interference plus noise ratio (SINR) of UEs which are influenced by interference is lowered.

FIG. 12 is a diagram illustrating the state in which D2D signal transmission resources collide again each other.

A case where UEs select the same transmission resources and send D2D signals in a D2D discovery process may be taken into consideration. That is, if UE 1 and UE 2 send D2D signals using the same resources in the situation of FIG. 12, the UEs may generate strong interference with nearby UEs because they use the same resources.

For the aforementioned D2D communication (i.e., D2D discovery and/or D2D direct communication), a method for controlling D2D signal transmission power of UEs may be used to solve an interference problem occurring due to frequency reuse. Power control can enhance the entire D2D communication performance because it reduces interference.

FIG. 13 is a diagram illustrating the results of the simulated experiments of a discovery signal reception radius according to power control of a discovery signal.

In the simulated experiments, the distance between UEs was 200 m, a total of 500 times were repeated, and an environment in which a total of 10,000 UEs were distributed was assumed. Furthermore, it was assumed that a radius was 1000 m and a discovery signal detection threshold=4.5 dB.

FIG. 13(a) illustrates a discovery signal reception radius if two UEs send discovery signals with maximum power. FIG. 13(b) illustrates a discovery signal reception radius if two UEs alternately (200 m distance) send discovery signals with different power.

If the two UEs send discovery signals with maximum power (23 dBm) as in FIG. 13(a), discovery signal reception radii 1301 are limited and appear small due to nearby strong interference.

In contrast, in FIG. 13(b), the two UEs alternately perform power control. That is, upon first transmission, left UE sends a discovery signal with power of 23 dBm, and right UE sends a discovery signal with power of 18 dBm. Upon next transmission, the left UE sends a discovery signal with power of 18 dBm, and the right UE sends a discovery signal with power of 23 dBm. If two UEs alternately send discovery signals with different power as described above, many surrounding UEs may receive discovery signals through interference control compared to a method for sending a discovery signal through maximum transmission as in FIG. 13(a), that is, an existing method. A radius capable of discovery signal transmission is also increased.

Furthermore, a collision may be newly defined. In a conventional technology, a collision may be defined to correspond to a case where the same resources are used by one or more UEs. If the distance between UEs against which a collision has occurred is distant, when the influence of interference is small, interference attributable to the collision does not need to be taken into consideration as interference. As a result, a collision may be defined to correspond to a case where the same resources are used by 2 or more UEs at a close distance.

If all of UEs perform power control as described above, it may be inefficient. The reason for this is that if power control is performed although interference is not present, transmission power of UE is reduced, the number of UEs capable of receiving a discovery signal is reduced, and a radius is also reduced. Furthermore, if UEs perform power control in an environment in which interference is not present, performance is reduced and thus corresponding D2D discovery delay is generated.

Accordingly, an embodiment of the present invention proposes a method in which all of UEs do not perform power control, but UEs in a congested environment adaptively control power based on a current surrounding state having a high probability that a collision may occur by taking various environments into consideration.

FIG. 14 is a diagram illustrating a power control method according to an embodiment of the present invention.

Referring to FIG. 14, UE calculates the sum of the intensities (or energy) of discovery signals received in the reception interval of a specific discovery signal at step S1401.

In this case, for example, the discovery reception interval may correspond to one or more subframes, a discovery resource pool, or a discovery period.

Furthermore, a set of discovery reception intervals means a set formed of one or more "discovery reception intervals."

The UE compares the sum of the intensities (or energy) of the discovery signals received in the reception interval of the specific discovery signal with a predetermined threshold at step S1402.

If, as a result of the comparison at step S1402, the sum of the intensities (or energy) is found to be greater than the threshold, the UE sends a discovery signal with controlled transmission power at step S1403.

In this case, for example, in a method for controlling transmission power of a discovery signal, the transmission power may be determined to be a value obtained by multiplying maximum transmission power by a control coefficient. In this case, the control coefficient may be determined to be a random value or may be determined based on a difference between the sum of the intensities (or energy) and the threshold (e.g., inverse proportion to the difference).

In contrast, if, as a result of the comparison at step S1402, the sum of the intensities (or energy) is found to be not greater than the threshold, the UE sends a discovery signal with maximum transmission power at step S1404.

A detailed algorithm according to an embodiment of the present invention is shown in Table 1 below.

TABLE 1

| Algorithm 1 Distributed Power Control Algorithm |  |
|---|---|
| 1: | for all t ∈ T do |
| 2: | for all k ∈ K do |
| 3: | $P_k^{(b)} \leftarrow P_{max}$ (t = 1) |
| 4: | $E_{sum} \leftarrow \sum_{b=1}^{B} \psi_k^{(b)}$ |
| 5: | $E^* \leftarrow E_{sum}$ |
| 6: | if $E^* > E_{thd}$ then |
| 7: | $P_k^{(b)} \leftarrow \alpha P_{max}$  $\alpha \in [0, 1]$ |
| 8: | else |
| 9: | $P_k^{(b)} \leftarrow P_{max}$ |
| 10: | end if |
| 11: | end for |
| 12: | end for |

Table 1 illustrates a distributed power control algorithm according to an embodiment of the present invention.

In Table 1, T indicates the reception interval set of a discovery signal, and "t" indicates the reception interval of a specific discovery signal within the reception interval set of a discovery signal.

K indicates a total number of D2D UEs, and "k" indicates specific D2D UE of the total number of D2D UEs.

B indicates all of discovery signals received from surrounding D2D UEs in the reception interval of a specific discovery signal, and "b" indicates a specific discovery signal of all of received discovery signals.

P_k^(b) indicates transmission power of the discovery signal "b" of k UE.

ψ_k^(b) indicates the intensity (dBm) of the discovery signal "b" received in the k UE.

Each of steps is described below on the assumption that the reception interval of a discovery signal is a discovery period, for convenience of description.

At a 3 step, the k UE sends a discovery signal with maximum power in the first discovery period (t=1) (3: P_k^(b)←P_max).

At a 4 step, the k UE measures the intensity of discovery signals received from surrounding UEs (4:

$$E\_sum \leftarrow \sum_{b=1}^{B} \psi_k^{(b)}$$.

At a 5 step, the k UE applies the measured intensity to an energy variable E* (5: E*←E_sum).

As described above, for sensing, each of UEs does not use specific resources, but may receive discovery signals in each search period and calculate the sum of all of discovery signals received for each search period.

$$\sum_{b=1}^{B} \psi_k^{(b)}$$

indicates the sum of energy of discovery signals received by the k UE in the discovery period.

If the sum of reception power of such discovery signals is greater than (or equal to or greater than) the predetermined threshold (6: if E*>E_thd then) at a 6 step, the k UE may determine a collision to be high and perform a power control procedure at a 7 step (7: P_k^(b)←αP_max). That is, the UE sets a power control coefficient "α" and controls power of a discovery signal as a power value obtained by multiplying maximum power by the power control coefficient. In this case, "α" has a random value between 0 and 1.

As a result, if power control is performed, a discovery signal is transmitted with power between very low power and maximum power. UEs having a high possibility of a collision can reduce interference in a distributed manner through such control. That is, if discovery signals are transmitted with different power in a continuous period, UEs can receive the discovery signal because interference between UEs is reduced due to power control of a discovery signal in a specific period.

In contrast, if the sum of reception power of a discovery signal is not greater than (or lower than) the predetermined threshold at a 8 step, the k UE determines that a probability that a collision may occur due to surrounding UEs is low, does not perform a power control procedure, and sends a discovery signal with maximum power as in a conventional technology at a 9 step (9: P_k^(b)←P_max).

The above process is performed on all of UEs (k∈K) according to the 2 step and 11 step, and is repeatedly performed in all of discovery periods (t∈T) according to the 1 step and 12 step.

If the reception interval of a discovery signal is a discovery period as described above, the process of Table 1 is performed for each discovery period. That is, transmission power of a discovery signal is determined for each discovery period.

For example, in the first discovery period, UE sends a discovery signal with transmission power determined by sensing discovery signals received from surrounding UE based on the algorithm of Table 1. In the second discovery period, the UE senses discovery signals received from surrounding UE again and determines transmission power.

Furthermore, after the UE calculates the sum of energy of the received discovery signals, the UE compares the calculated sum with a threshold. If, as a result of the comparison, the calculated sum is found to be lower than the threshold, the UE sends a discovery signal with maximum transmission power. If, as a result of the comparison, the calculated sum is found to be not lower than the threshold, the UE randomly selects transmission power and sends a discovery signal.

As described above, the reception interval of a discovery signal may include one or more subframes.

For example, the reception interval of a discovery signal may be set as a period up to one or more subframes (or including a corresponding subframe) prior to a subframe in which UE sends a discovery signal.

For another example, the reception interval of a discovery signal may be set as a period from a subframe at which a discovery resource pool (more specifically, a subframe pool for discovery) starts to a subframe (or including the corresponding subframe) prior to a subframe in which corresponding UE sends a discovery signal.

In this case, the UE may calculate the sum of the intensities (or energy) of discovery signals received from surrounding UE in subframes (or including the corresponding subframe) before the UE sends the discovery signal, and may compare the calculated sum with a threshold. Furthermore, if, as a result of the comparison, the sum of the intensities (or energy) of the discovery signals is found to be greater than (or equal to or greater than) the threshold, the UE may randomly select transmission power and send a discovery signal. If, as a result of the comparison, the sum of the intensities (or energy) of the discovery signals is found to be smaller than or equal to (or smaller than) the threshold, the UE may send the discovery signal with maximum transmission power.

For another example, the reception interval of a discovery signal may be set as a period from a subframe (or from a corresponding subframe) subsequent to a subframe in which a discovery signal has been most recently transmitted to a subframe (or including the corresponding subframe) prior to a subframe in which corresponding UE sends a discovery signal.

In a single discovery resource pool, UE may repeatedly (e.g., twice to four times) send a discovery signal. In such a case, the UE may independently perform power control for each discovery signal that is repeatedly transmitted.

More specifically, the UE may calculate the sum of the intensities (or energy) of discovery signals received from surrounding UE in subframes from a subframe (or including a corresponding subframe) subsequent to the subframe of a discovery signal that has been most recently transmitted before the discovery signal is transmitted to a subframe (or including the corresponding subframe) prior to a subframe in which the UE sends the discovery signal, and may compare the calculated sum with a threshold. Furthermore, if, as a result of the comparison, the sum of the intensities (or energy) of the discovery signals is found to be greater than (or equal to or greater than) the threshold transmission power, the UE may randomly select transmission power and send the discovery signal. If, as a result of the comparison, the sum of the intensities (or energy) of the discovery signals is found to smaller than or equal to (or smaller than) the threshold, the UE may send the discovery signal with maximum transmission power.

In this case, in the case of a discovery signal that is first transmitted within a discovery resource pool, the reception interval of the discovery signal may be set as a period from a subframe in which the discovery resource pool (more specifically, a subframe pool for discovery) starts to a subframe (or including the corresponding subframe) prior to a subframe in which the UE sends the discovery signal.

Furthermore, in the case of the discovery signal that is first transmitted within the discovery resource pool, the UE does not perform power control based on sensing, but may send the discovery signal with maximum transmission power.

The reception interval of a discovery signal may include a discovery resource pool.

If UE performs the transmission and reception of a discovery signal within the same discovery resource pool, the UE may control transmission power of a discovery signal as in the example of Table 1.

If a discovery transmission resource pool and a discovery reception resource pool are individually set and the discovery transmission resource pool does not overlap the discovery reception resource pool, UE does not perform power control based on sensing in the corresponding discovery transmission resource pool.

In this case, the UE does not perform power control, but may send a discovery signal with maximum transmission power.

For another example, UE may calculate the sum of the intensities (or energy) of discovery signals received in the most recent discovery reception resource pool prior to a discovery transmission resource pool, and may compare the calculated sum with a threshold.

Furthermore, if, as a result of the comparison, the sum of the intensities (or energy) of the received discovery signals is greater than (or equal to or greater than) the threshold, the UE randomly selects transmission power and sends a discovery signal. If, as a result of the comparison, the sum of the intensities (or energy) of the received discovery signals is smaller than or equal to (or smaller than) the threshold, the UE may send a discovery signal with maximum transmission power.

FIG. 15 is a diagram illustrating in-band interference attributable to a power imbalance.

In-band interference is generated in uplink and generated due to the offset of the power spectrum density (PSD) of received signals. That is, as shown in FIG. 15, in-band interference is generated due to the offset of reception PSD from a resource block (RB) of high reception PSD to the RB of low reception PSD.

In an existing cellular network, uplink reception is fixed to an eNB. In such a case, the eNB can reduce the offset of the PSD by setting similar received signals in such a way as to set low power in UEs near the eNB and to set high power in UEs distant from the eNB through a reference signal or closed loop control.

In contrast, in the case of D2D communication, power cannot be set based on specific UE because there are several receiving ends. More specifically, in the case of D2D discovery, transmission UE is unaware of the location of reception UE or the number of reception UEs through an initial operation. That is, although UE is nearby, it may send a discovery signal with maximum power without power control because receiving ends correspond to several UEs. In such a case, discovery signals transmitted in nearby RBs may not be received due to in-band interference.

FIG. 16 is a diagram illustrating in-band interference if discovery transmission power has been controlled and if discovery transmission power has not been controlled according to an embodiment of the present invention.

In such D2D communication, if UE 1 is located nearby and sends a strong signal (i.e., if the UE 1 is interference UE) and UE 2 is distant and receives a weak signal (i.e., the UE 2 is victim UE), if the UE 1 does not perform power control as shown in FIG. 16(a), surrounding UE does not continue to receive a discovery signal from the UE 2 due to in-band interference.

In accordance with a method proposed by an embodiment of the present invention, if the UE 1 continuously sends a discovery signal with various power levels by randomly controlling transmission power of the discovery signal, a PSD offset with a nearby RB is reduced at any time point as shown in FIG. 16(b), and thus surrounding UE can receive a discovery signal from the UE 2 because in-band interference is reduced.

As described above, if collision interference and in-band interference attributable to the selection of redundant resources are removed through power control in a distributed manner using the technology proposed by an embodiment of the present invention, a transmission SINR in D2D communication (more specifically, the D2D discovery step) can be improved.

Furthermore, to this end, the proposed method may adopt the present D2D communication method without any change even without a specific protocol or an interface between D2D UEs. If interference between UEs is reduced through such a power control method, many discovery resources, that is, an object of a D2D discovery process, can be received and can be transmitted in a wide range because the received SINR of UEs can be improved although a controller, such as an eNB, is not present.

In the description of the present invention, a discovery signal (i.e., a PSDCH) has been basically described, for convenience of description, but transmission power of a PSCCH, PSSCH and/or PSBCH may be controlled in the same manner. That is, the sum of intensities of discovery signals received in a specific discovery signal reception interval may be compared with a threshold, and transmission power of the PSCCH, PSSCH and/or PSBCH can be controlled based on a result of the comparison.

General wireless communication to which the present invention is applicable

FIG. 17 illustrates a block diagram of a wireless communication apparatus according to an embodiment of the present invention.

Referring to FIG. 17, a wireless communication system includes a eNB 1710 and a multitude of UEs 1720.

The eNB 1710 includes a processor 1711, a memory 1712, and a radio frequency (RF) unit 1713. The processor 1711 implements the function, process, and/or method proposed in FIGS. 1 to 16. The layers of wireless interface protocols may be implemented by the processor 1711. The memory 1712 may be connected to the processor 1711 so as to store various informations in order to drive the processor 1711. The RF unit 1713 may be connected to the processor 1711 so as to transmit and/or receive a wireless signal.

The UE 1720 includes a processor 1721, a memory 1722, and a RF unit 1723. The processor 1721 implements the function, process and/or method proposed in FIGS. 1 to 16. The layers of the wireless interface protocol may be implemented by the processor 1721. The memory 1722 may be connected to the processor 2121 so as to store various informations for driving the processor 1721. The RF unit 1723 is connected to the processor 1721 so as to transmit/or receive a wireless signal.

The memories 1712 and 1722 may be inside or outside processors 1711 and 1721 and may be connected to the processors 1711 and 1721 by well-known various means. Further, the eNB 1710 and/or the UE 1720 may include a single antenna or a multiple antenna.

In the aforementioned embodiments, the elements and characteristics of the present invention have been combined in specific forms. Each of the elements or characteristics may be considered to be optional unless otherwise described explicitly. Each of the elements or characteristics may be implemented in such a way as to be not combined with other elements or characteristics. Furthermore, some of the elements and/or the characteristics may be combined to form an embodiment of the present invention. The order of the operations described in connection with the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

An embodiment of the present invention may be implemented by various means, for example, hardware, firmware, software or a combination of them. In the case of implementations by hardware, an embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers and/or microprocessors.

In the case of an implementation by firmware or software, an embodiment of the present invention may be implemented in the form of a module, procedure, or function for performing the aforementioned functions or operations. Software code may be stored in memory and driven by a processor. The memory may be located inside or outside the processor, and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

A method for controlling sensing-based power for D2D communication in a wireless communication system according to the present invention was described centering on an example applicable to 3GPP LTE/LTE-A system, but the scheme may also be applied to various wireless communication systems as well as the 3GPP LTE/LTE-A system.

What is claimed is:

1. A method for controlling, by UE, transmission power of a physical sidelink discovery channel (PSDCH) in a wireless communication system supporting device-to-device (D2D) communication, the method comprising:
calculating a sum of reception intensities of PSDCHs received in a specific PSDCH reception interval; and
sending a PSDCH,
wherein if the sum of the reception intensities of the PSDCHs is greater than a predetermined threshold, the transmitted PSDCH is transmitted with transmission power controlled by the UE, and
if the sum of the reception intensities of the PSDCHs is not greater than the predetermined threshold, the transmitted PSDCH is transmitted with maximum transmission power.

2. The method of claim 1, wherein the controlled transmission power is determined by multiplying the maximum transmission power by a specific value between 0 and 1.

3. The method of claim 1, wherein the PSDCH reception interval comprises a single discovery period.

4. The method of claim 3, wherein in the single discovery period, the transmitted PSDCH is transmitted with maximum transmission power.

5. The method of claim 1, wherein the PSDCH reception interval comprises subframes from a first subframe within a single discovery resource pool to a subframe prior to a subframe in which the transmitted PSDCH is transmitted.

6. The method of claim 1, wherein the PSDCH reception interval comprises subframes from a subframe subsequent to a subframe in which a PSDCH is most recently transmitted prior to the transmitted PSDCH to a subframe prior to a subframe in which the transmitted PSDCH is transmitted.

7. The method of claim 1, wherein if the transmitted PSDCH is repeatedly transmitted in a single discovery resource pool, a first transmitted PSDCH is transmitted with maximum transmission power.

8. The method of claim 1, wherein if a PSDCH transmission resource pool and a PSDCH reception resource pool are separately configured, a sum of reception intensities of PSDCHs received in a most recent PSDCH reception resource pool prior to a PSDCH transmission resource pool to which the transmitted PSDCH belongs is calculated.

9. UE controlling transmission power of a physical sidelink discovery channel (PSDCH) in D2D communication in a wireless communication system supporting device-to-device (D2D) communication, the UE comprising:
a radio frequency (RF) unit transmitting and receiving a radio signal; and
a processor,
wherein the processor is configured to calculate a sum of reception intensities of PSDCHs received in a specific PSDCH reception interval and to send a PSDCH,
if the sum of the reception intensities of the PSDCHs is greater than a predetermined threshold, the transmitted PSDCH is transmitted with transmission power controlled by the UE, and
if the sum of the reception intensities of the PSDCHs is not greater than the predetermined threshold, the transmitted PSDCH is transmitted with maximum transmission power.

* * * * *